US010583867B2

(12) United States Patent
Kageyama et al.

(10) Patent No.: US 10,583,867 B2
(45) Date of Patent: Mar. 10, 2020

(54) LOWER VEHICLE-BODY STRUCTURE OF AUTOMOTIVE VEHICLE

(71) Applicant: MAZDA MOTOR CORPORATION, Hiroshima (JP)

(72) Inventors: Kazuhiro Kageyama, Hiroshima (JP); Hidetaka Goto, Higashihiroshima (JP); Shogo Sakomoto, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 81 days.

(21) Appl. No.: 15/959,854

(22) Filed: Apr. 23, 2018

(65) Prior Publication Data
US 2019/0009834 A1   Jan. 10, 2019

(30) Foreign Application Priority Data
Jul. 6, 2017  (JP) ................. 2017-132630

(51) Int. Cl.
*B62D 25/20*  (2006.01)
*B62D 21/03*  (2006.01)
*B62D 21/15*  (2006.01)
*B62D 27/02*  (2006.01)
*B60N 2/015*  (2006.01)
*B62D 25/02*  (2006.01)
*B62D 25/04*  (2006.01)

(52) U.S. Cl.
CPC ......... *B62D 25/2036* (2013.01); *B60N 2/015* (2013.01); *B62D 21/03* (2013.01); *B62D 21/157* (2013.01); *B62D 25/025* (2013.01); *B62D 25/04* (2013.01); *B62D 27/023* (2013.01)

(58) Field of Classification Search
CPC .. B62D 25/2036; B62D 21/03; B62D 21/157; B62D 25/025; B62D 27/023; B60N 2/015
See application file for complete search history.

(56) References Cited

U.S. PATENT DOCUMENTS

2010/0237659 A1*  9/2010  Ishigame ............. B62D 21/157
                                                    296/204
2011/0057487 A1*  3/2011  Suzuki ................. B60N 2/4235
                                                    297/216.13

FOREIGN PATENT DOCUMENTS

DE    102018005066 A1 *  1/2019 ............. B62D 25/20
JP    2010-228482 A    10/2010
(Continued)

OTHER PUBLICATIONS

An Office Action; "Notice of Reasons for Refusal," issued by the Japanese Patent Office dated May 14, 2019, which corresponds to Japanese Patent Application No. 2017-132630 and is related to U.S. Appl. No. 15/959,854; with English Translation.

*Primary Examiner* — Lori L Lyjak
(74) *Attorney, Agent, or Firm* — Studebaker & Brackett PC

(57) ABSTRACT

In a lower vehicle-body structure of an automotive vehicle comprising a pair of right-and-left side sills, a floor panel, and a first seat-attaching bracket supporting a front seat, an upper wall portion of the first seat-attaching bracket comprises an attachment portion to which the front seat is attached, a slant portion (connection portion) which extends downward from an outward-side edge side of the attachment portion, and a stepped-down portion which extends from the slant portion toward the side sill, and a bead which protrudes upward and extends from the slant portion toward the side sill in the vehicle width direction is provided at the stepped-down portion.

8 Claims, 11 Drawing Sheets

(56) References Cited

FOREIGN PATENT DOCUMENTS

JP 2011-218944 A 11/2011
JP 2016-210335 A 12/2016

* cited by examiner

FIG. 1

LOWER VEHICLE-BODY STRUCTURE OF AUTOMOTIVE VEHICLE

BACKGROUND OF THE INVENTION

The present invention relates to a lower vehicle-body structure of an automotive vehicle which comprises a seat-attaching bracket supporting a seat where a passenger is seated.

In general, the seat where the passenger is seated is fixed to a portion of a vehicle body which has relatively-high rigidity in a cabin of the automotive vehicle in order to secure the ride comfort (ride quality) of the passenger. For example, in a structure disclosed in Japanese Patent Laid-Open Publication No. 2010-228482, a front portion of the seat where the passenger is seated is supported at a cross member 20 (No. 2 cross member) which interconnects right-and-left side sills 6 via a tunnel portion 2 of a floor panel 1 which forms a bottom face of the cabin.

Meanwhile, a rear portion of the seat is supported at a seat-attaching bracket (connecting member 35) which is joined both to a cross member 30 (No. 2.5 cross member) interconnecting the right-and-left side sills 6 via the tunnel portion 2 at a position located in back of the cross member 20 and another seat-attaching bracket (connecting member 36) which is joined both to the cross member 30 and the tunnel portion 2.

In other words, in the structure disclosed in the above-described patent document, when another vehicle collides with a side portion of an own vehicle or the side portion of the own vehicle collides with an obstacle, the seat where the passenger is seated is fixed onto a load transmission path where a side-collision load as a collision load applied from a vehicle side is transmitted/dispersed from one side to the other side in a vehicle width direction.

Herein, the structure disclosed in the above-described patent document is configured such that the seat is fixedly fastened to an inward-side end portion, in the vehicle width direction, of a roughly flat-plate shaped upper wall portion of the seat-attaching bracket (connecting member 35) which is joined to the cross member 30 and the side sill 6.

Accordingly, the upper face portion of the seat-attaching bracket (connecting member 35) has a large area, so that its surface rigidity against a load which is applied in a vehicle vertical direction tends to be low. Further, since a weight of the passenger tends to act on the rear portion of the seat in a state where the passenger is seated, there is a problem that if the surface rigidity of the upper face portion is low, the upper face portion may be easily deformed due to vertically-directional vibration of a vehicle body which is generated during vehicle traveling in a case where the seat-attaching bracket (connecting member 35) supports the rear portion of the seat as disclosed in the above-described patent document.

In this case where the upper face portion is easily deformed due to the vertically-directional vibration of the vehicle body, when the automotive vehicle rides over a slope, for example, the upper face portion of the seat-attaching bracket (connecting member 35) starts its deformation in an early stage, so that there is a concern that an urethane cushion forming the seat may not sufficiently damp the vertically-directional vibration of the vehicle body, so that the vibration may be transmitted to the passenger improperly.

Additionally, if the seat rear portion is made to swing in the vehicle vertical direction by the deformation of the upper face portion, a seatback of the seat swings in a vehicle longitudinal direction in accordance with this vertically-directional swing. Thereby, a head portion of the passenger is forced to swing, so that there is a concern that the ride comfort of the passenger may be deteriorated.

SUMMARY OF THE INVENTION

In view of the above-described problems, an object of the present invention is to provide a lower vehicle-body structure of an automotive vehicle which can improve the surface rigidity of the upper face portion of the seat-attaching bracket, without deteriorating its serving as the load transmission path where the side-collision load from the vehicle side is transmitted.

The present invention is a lower vehicle-body structure of an automotive vehicle comprising a pair of right-and-left side sills extending in a vehicle longitudinal direction, a floor panel connecting the pair of right-and-left side sills in a vehicle width direction, and a seat-attaching bracket connecting the side sill and the floor panel and supporting a seat where a passenger is seated, the seat-attaching bracket being provided with an upper wall portion, characterized in that the upper wall portion of the seat-attaching bracket comprises a seat-attachment portion which is positioned at an inward side, in the vehicle width direction, thereof and to which the seat is attached, a stepped-down portion which is positioned at a portion thereof which is located on an outward side, in the vehicle width direction, of the seat-attachment portion and extends toward the side sill, and a connection portion which is connected to an outward-side end, in the vehicle width direction, of the seat-attachment portion at an upper end thereof, extends downward from the upper end, and connected to an inward-side end, in the vehicle width direction, of the stepped-down portion at a lower end thereof, and a bead is provided at the stepped-down portion of the upper wall portion of the seat-attaching bracket, the bead being configured to protrude upward and extend from the connection portion toward the side sill in the vehicle width direction.

According to the present invention, the surface rigidity of the upper wall portion (which corresponds to the above-described upper face portion) of the seat-attaching bracket can be improved, without deteriorating its serving as the load transmission path where the side-collision load from the vehicle side is transmitted. Specifically, since the connection portion is provided at the upper wall portion, the lower vehicle-body structure of the automotive vehicle is configured such that an area of the seat-attachment portion and an area of the stepped-down portion can be made respectively small and also the connection portion can be made to serve as a knot for the upper wall portion, so that deformation of the upper wall portion which may be caused by the vibration of the vehicle body during the vehicle traveling can be suppressed properly.

Further, since the bead extending in the vehicle width direction is provided at the stepped-down portion, the lower vehicle-body structure of the automotive vehicle is configured such that the surface rigidity of the stepped-down portion against the vehicle-body vibration can be improved and also the support rigidity of the seat-attachment portion can be improved.

Thereby, the surface rigidity of the upper wall portion of the seat-attaching bracket can be improved. Accordingly, when the automotive vehicle rides over the slope, for example, it can be prevented that the upper wall portion of the seat-attaching bracket starts its deformation caused by the vehicle-body vibration in an early stage and also the damping performance of the urethane cushion forming the seat can be sufficiently achieved.

Herein, since swinging of the seat both in the vehicle vertical direction and in the vehicle longitudinal direction can be suppressed by improvement of the surface rigidity of the upper wall portion, swinging of the head portion of the passenger is so suppressed that the ride comfort of the passenger can be improved properly.

Additionally, since the bead provided at the stepped-down portion is provided to extend from the connection portion toward the side sill, it can be prevented that a border between the stepped-down portion and the connection portion becomes a fragile (weak) part against the side-collision load.

Therefore, when the side-collision load is applied to the seat-attaching bracket, it can be prevented by the bead provided at the stepped-down portion that the seat-attaching bracket is bent and deformed with a starting point at the border between the stepped-down portion and the connection portion.

Thus, the low vehicle-body structure of the automotive vehicle according to the present invention can improve the surface rigidity of the upper wall portion of the seat-attaching bracket, without deteriorating its serving as the load transmission path where the side-collision load from the vehicle side is transmitted.

In an embodiment of the present invention, the bead provided at the stepped-down portion of the upper wall portion of the seat-attaching bracket is positioned substantially at a center, in the vehicle longitudinal direction, of the stepped-down portion.

According to this embodiment, the rigidity of the stepped-down portion against the side-collision load can be stably improved. Thus, the low vehicle-body structure of the automotive vehicle according to this embodiment can stably improve the surface rigidity of the upper wall portion of the seat-attaching bracket, without deteriorating its serving as the load transmission path where the side-collision load from the vehicle side is transmitted.

In another embodiment of the present invention, the lower vehicle-body structure of the automotive vehicle further comprises a cross member provided between the seat-attaching bracket and the floor panel, wherein the cross member is configured to have a roughly M-shaped cross section, in a vertical section along the vehicle longitudinal direction, such that a portion thereof which corresponds to the bead of the seat-attaching bracket in a vehicle vertical direction protrudes downward and forms a closed cross section together with the seat-attaching bracket.

According to this embodiment, a large sectional area of the load transmission path at the stepped-down portion can be secured. Therefore, the rigidity of the load transmission path against the side-collision load from the vehicle side can be improved. Thus, the low vehicle-body structure of the automotive vehicle according to this embodiment can improve the surface rigidity of the upper wall portion of the seat-attaching bracket and the rigidity of the load transmission path where the side-collision load from the vehicle side is transmitted.

In another embodiment of the present invention, the side sill is configured such that an upper face portion thereof has a protrusion portion which protrudes toward an outward side from an inward side, in the vehicle width direction, of the vehicle substantially at the same position, in the vehicle longitudinal direction, as the bead.

According to this embodiment, the rigidity of the upper face portion of the side sill can be improved. Further, since the protrusion portion of the side sill and the bead of the seat-attaching bracket are located substantially at the same position in the vehicle longitudinal direction, the rigidity of the load transmission path where the collision load is transmitted can be further improved. Thus, the low vehicle-body structure of the automotive vehicle according to this embodiment can securely improve the rigidity of the load transmission path where the side-collision load from the vehicle side is transmitted.

In another embodiment of the present invention, the side sill comprises front-and-rear gusset members which are respectively provided inside the side sill at positions, in the vehicle longitudinal direction, which substantially correspond to front-and-rear ends of the seat-attaching bracket and joined to the side sill, the seat-attaching bracket comprises a first flange portion which is joined to the front gusset member through the side sill, a second flange portion which is joined to the rear gusset member through the side sill, and a third flange which is joined to the side sill, and a joint point of the side sill and the third flange portion is, in a side view, located between the front gusset member and the rear gusset member and at a higher level than a joint point of the front gusset member and the first flange portion and a joint point of the rear gusset member and the second flange portion. Herein, the first flange portion, the second flange portion, and the third flange portion may be configured such that these three portions are formed separately from each other or formed integrally as a single flange portion.

According to this embodiment, a roughly-triangular imaginary plane which is made by connecting the joint point of the front gusset member and the first flange portion, the joint point of the rear gusset member and the second flange portion, and the joint point of the side sill and the third flange portion can be formed. Accordingly, when the side-collision load is transmitted from the side sill to the seat-attaching bracket, for example, the side-collision load can be transmitted via the roughly-triangular imaginary plane. Thereby, deformation of the first flange portion, the second flange portion, and the third flange portion which may be caused by the side-collision load can be suppressed more properly, compared to a case where the side sill and the flange portion of the seat-attaching bracket are joined at two joint points. Thus, the low vehicle-body structure of the automotive vehicle according to this embodiment can improve the surface rigidity of the upper wall portion of the seat-attaching bracket and the rigidity of the load transmission path where the side-collision load from the vehicle side is transmitted by joining the side sill and the third flange portion at a position located at a higher level than the joint point of the front gusset member and the first flange portion and the joint point of the rear gusset member and the second flange portion.

In another embodiment of the present invention, the seat-attaching bracket comprises a single flange portion which is integrally formed by connecting the first flange portion, the second flange portion, and the third flange portion.

According to this embodiment, the rigidity of the flange portion of the seat-attaching bracket can be improved and the connection strength of the seat-attaching bracket and the side sill can be further improved. Further, a portion corresponding to the first flange portion, a portion corresponding to the second flange portion, and a portion corresponding to the third flange portion can support the upper wall portion of the seat-attaching bracket. Accordingly, in a state where the seat-attaching bracket is joined to the side sill, the flange portion can support the upper wall portion more securely, compared to a case where the upper wall portion is supported only by the third flange portion. Thereby, the deformation of the upper wall portion which may be caused by the vehicle-body vibration during the vehicle traveling can be suppressed more securely. Thus, the low vehicle-body structure of the automotive vehicle according to this embodiment can more securely improve the surface rigidity of the upper wall portion of the seat-attaching bracket by providing the single flange portion integrally formed by connecting the first flange portion, the second flange portion, and the third flange portion.

Herein, as a more preferable specific structure of the low vehicle-body structure of the automotive vehicle, the seat-attaching bracket further comprises a front wall portion which is connected to a front end of the upper wall portion at an upper end thereof, joined to the side sill at an outward-side end thereof, and joined to the floor at a lower end thereof, a rear wall portion which is connected to a rear end of the upper wall portion at an upper end thereof, joined to the side sill at an outward-side end thereof, and joined to the floor at a lower end thereof, and a side wall portion which is connected to the upper wall portion at an upper end thereof, connected to an inward-side end of the front wall portion at a front end thereof, and connected to the floor at a lower end thereof, and the single flange portion is integrally formed by connecting a portion which extends forward from an outward-side end, in the vehicle width direction, of the front wall portion, which corresponds to the above-described first flange portion, a portion which extends rearward from an outward-side end, in the vehicle width direction, of the rear wall portion, which corresponds to the above-described second flange portion, and a portion which extends upward from an outward-side end, in the vehicle width direction, of the upper wall portion, which corresponds to the above-described third flange portion.

Further, in another embodiment of the present invention, the side sill is configured such that an inward-side side face portion thereof comprises a lower portion to which the floor panel and the seat-attaching bracket are joined and an upper portion which extends upward from an upper end of the lower portion and is provided to be offset outward, in the vehicle width direction, from the lower portion, the seat-attaching bracket comprises a front flange portion which extends forward from an outward-side edge portion thereof and is joined to the lower portion of the side sill and a rear flange portion which extends rearward from the outward-side edge portion thereof and is joined to the lower portion of the side sill, and the bead provided at the seat-attaching bracket is configured to slant toward an outward-side edge portion, in the vehicle width direction, of the stepped-down portion in a vehicle front view.

According to this embodiment, light weighting of the side sill and improving of the surface rigidity of the upper wall portion of the seat-attaching bracket can be compatibly achieved. Specifically, the weight of the side sill can be more reduced by the side face portion of the side sill comprising the lower portion and the upper portion which are offset from each other in the vehicle width direction, compared to the weight of the side sill having a roughly flat-plate shaped side face portion. Further, in a case of the seat-attaching bracket in which a portion extending upward from the outward-side edge portion of the stepped-down portion is configured as a flange and the bead is provided to extend from the connection portion toward this flange, for example, the upper wall portion of the seat-attaching bracket tends to become a complex structure, so that it may be difficult to secure stable formability. In particular, in a case where there is provided a flange which is formed integrally by portions which respectively extend from a front end and a rear end of the seat-attaching bracket and a portion which extends upward from the outward-side edge portion of the stepped-down portion, the seat-attaching bracket is more complex-structural, so that the stable formability may be difficult to obtain.

According to this embodiment, however, the upper wall portion of the seat-attaching bracket can be prevented from becoming the complex structure by the bead configured to slant toward the outward-side edge portion of the stepped-down portion, so that the formability of the seat-attaching bracket can be secured easily. Thus, the low vehicle-body structure of the automotive vehicle according to this embodiment can more stably improve the surface rigidity of the upper wall portion of the seat-attaching bracket, so that light weighting of the side sill and improving of the surface rigidity of the upper wall portion of the seat-attaching bracket can be compatibly achieved.

Other features, aspects, and advantages of the present invention will become apparent from the following description which refers to the accompanying drawings.

BRIEF DESCRIPTION OF THE DRAWINGS

FIG. 1 is a perspective view showing an external appearance of a lower vehicle body of an automotive vehicle.

DETAILED DESCRIPTION OF THE INVENTION

Figure 2:
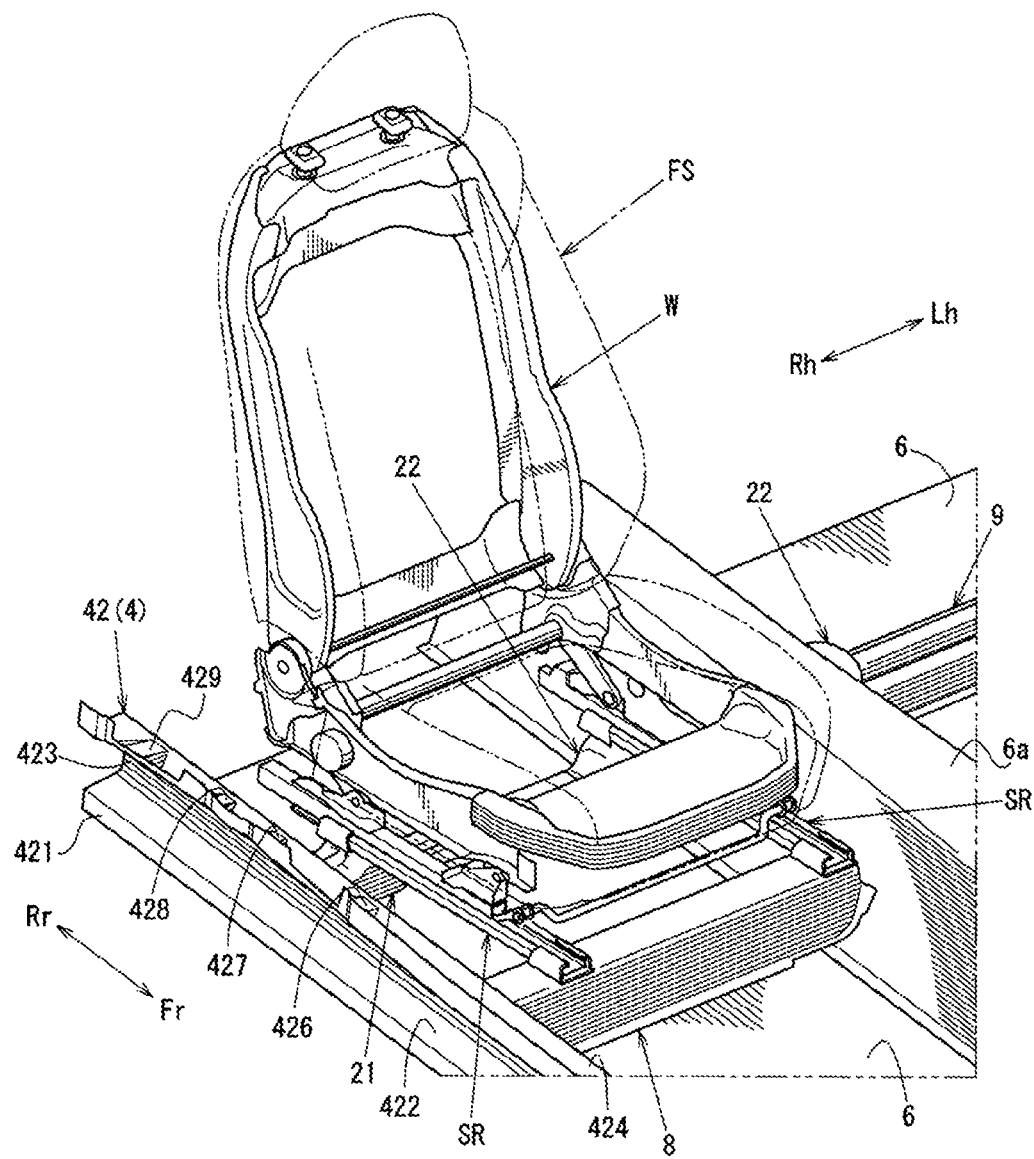
FIG. 2 is a perspective view showing an external appearance of the lower vehicle body of the automotive vehicle in a state where a seat is installed.

Hereafter, embodiments of the present invention will be described referring to the drawings.

Embodiment 1

Figure 1:
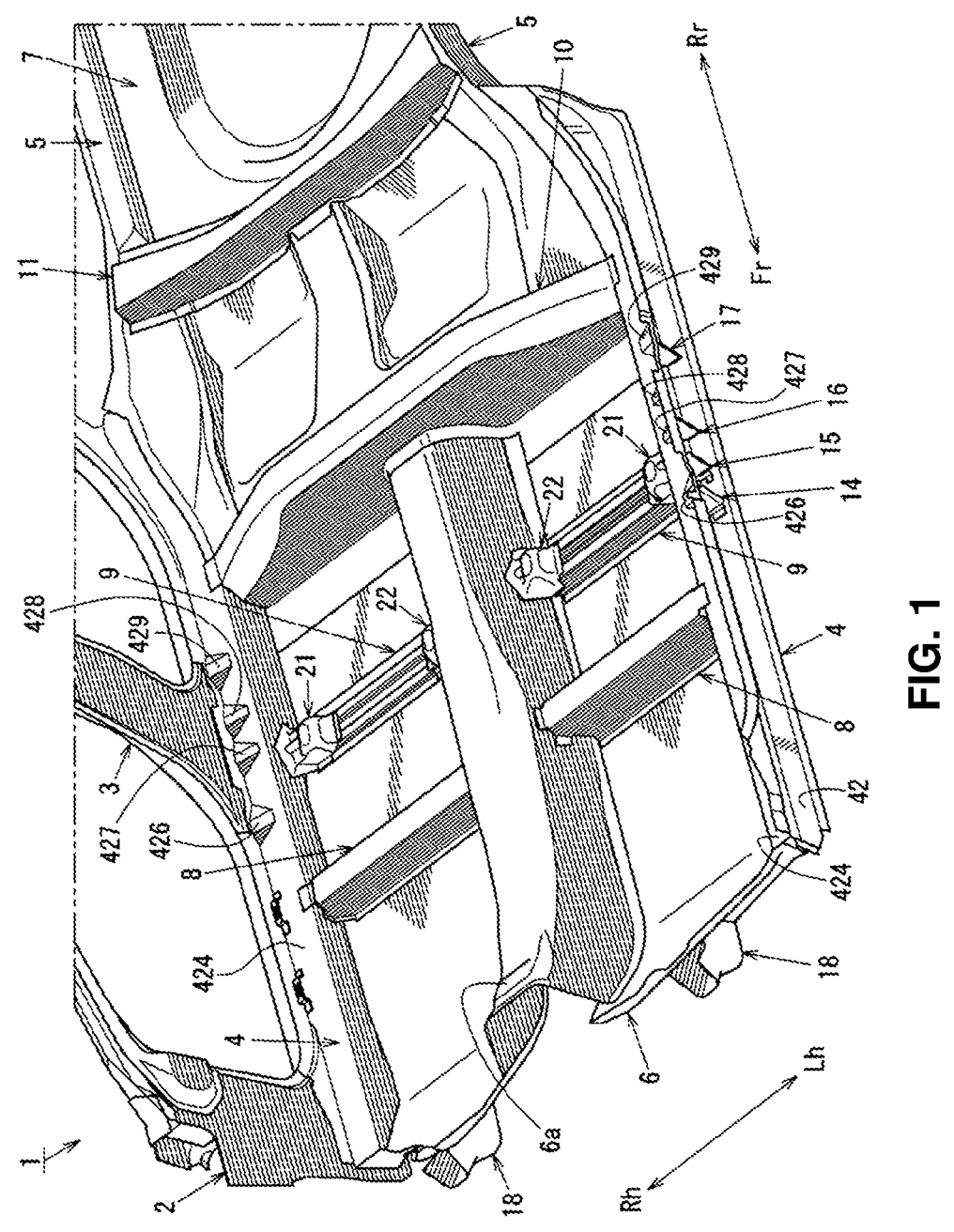
Figure 3:
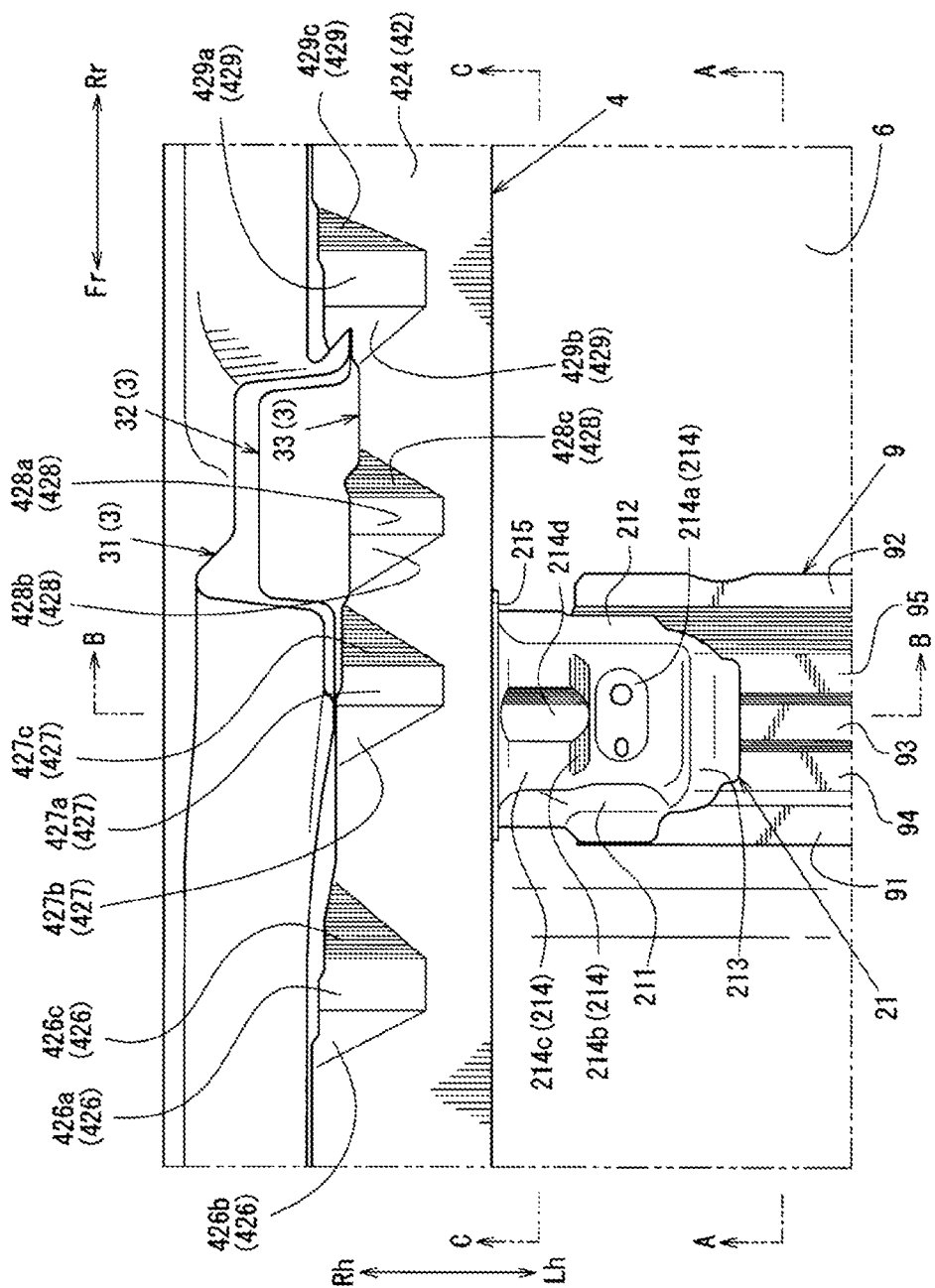
FIG. 3 is a plan view showing an external appearance a part of the lower vehicle body near a center pillar.
Figure 4:
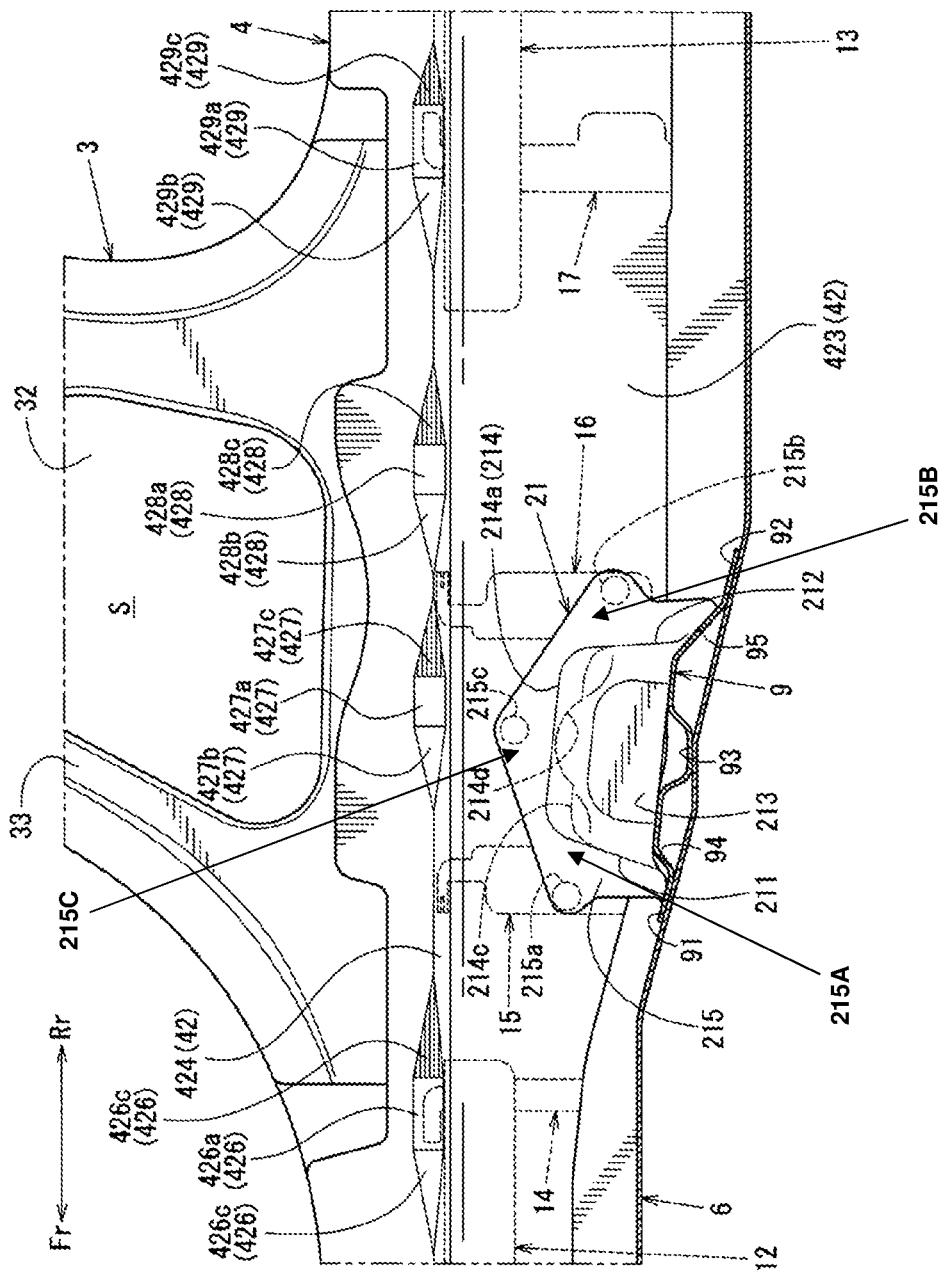
FIG. 4 is a side view showing a side face of the part of the lower vehicle body taken along line A-A of FIG. 3.
Figure 6:
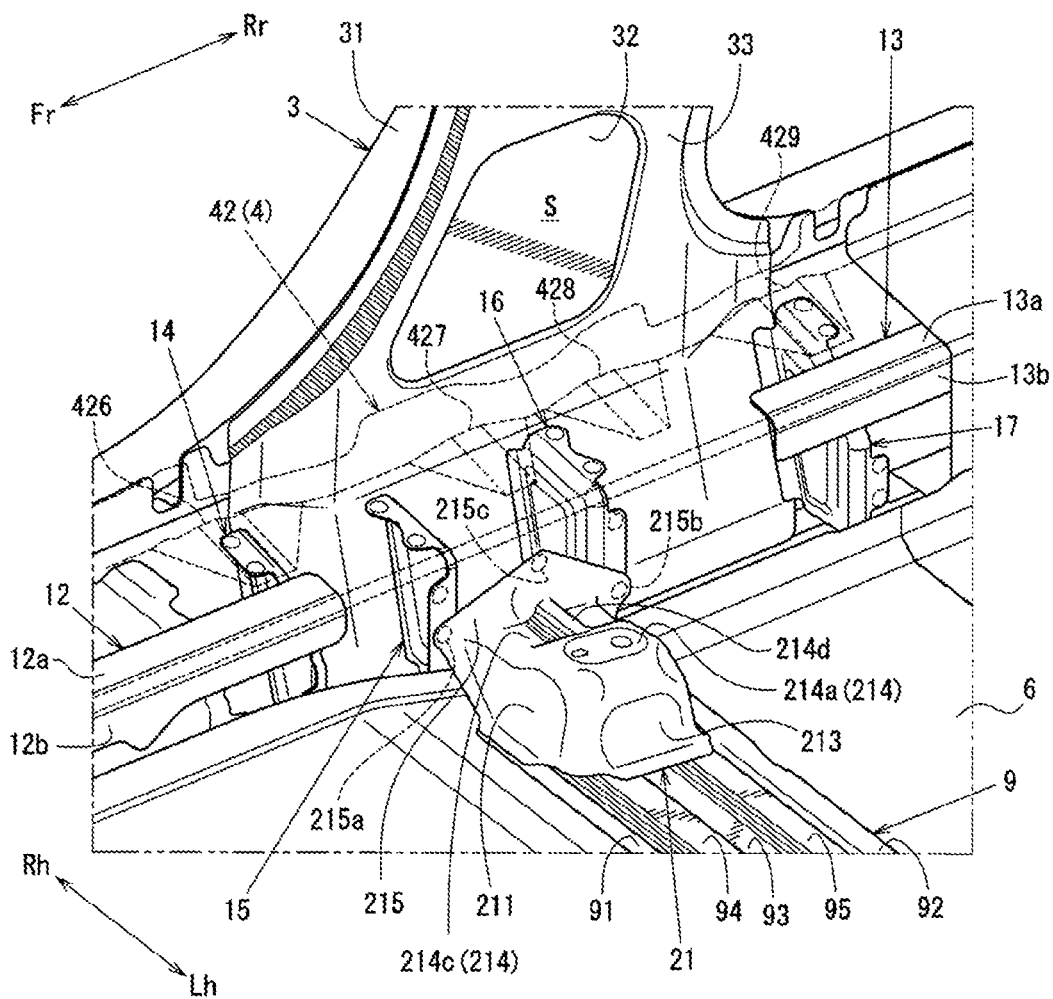
FIG. 6 is a perspective view showing an external appearance of a part of the lower vehicle body near a lower portion of the center pillar.
Figure 7:
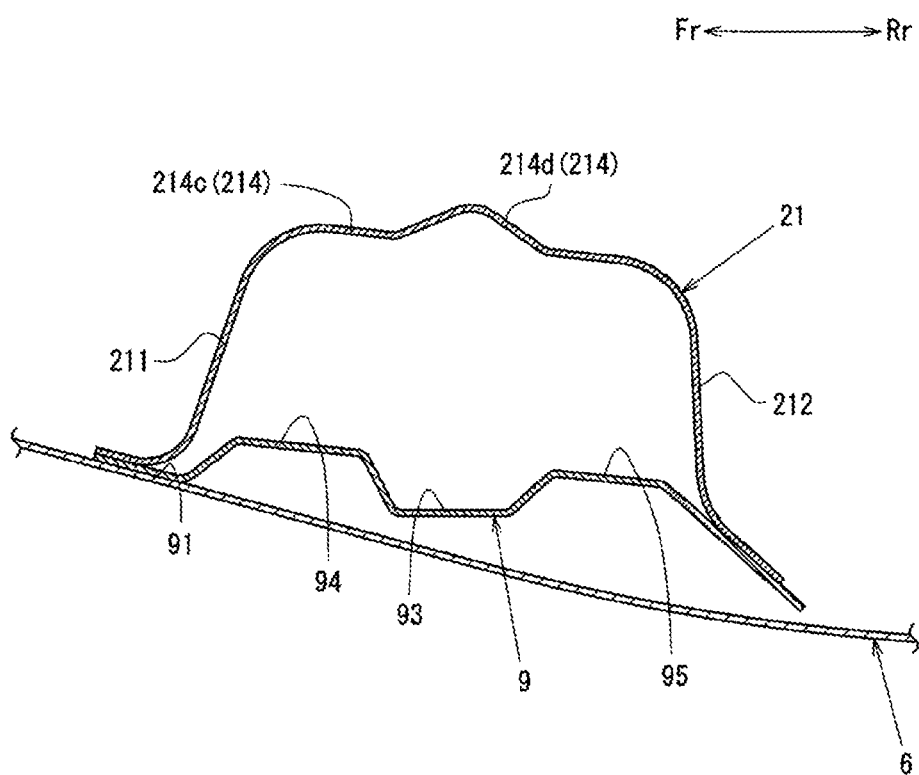
FIG. 7 is a sectional view taken along line C-C of FIG. 3.

A lower-vehicle body structure of an automotive vehicle 1 according to a first embodiment will be described specifically referring to FIGS. 1 through 7. Herein, FIG. 1 is a perspective view showing an external appearance of a lower vehicle body of the automotive vehicle 1, FIG. 2 is a perspective view showing an external appearance of the lower vehicle body of the automotive vehicle 1 in a state where a front seat FS is installed, FIG. 3 is a plan view showing an external appearance a part of the lower vehicle body near a center pillar 3, FIG. 4 is a side view showing a side face of the part of the lower vehicle body taken along line A-A of FIG. 3, FIG. 5 is a sectional view taken along line B-B of FIG. 3, FIG. 6 is a perspective view showing an external appearance of a part of the lower vehicle body near a lower portion of the center pillar 3, and FIG. 7 is a sectional view taken along line C-C of FIG. 3.

Figure 5:
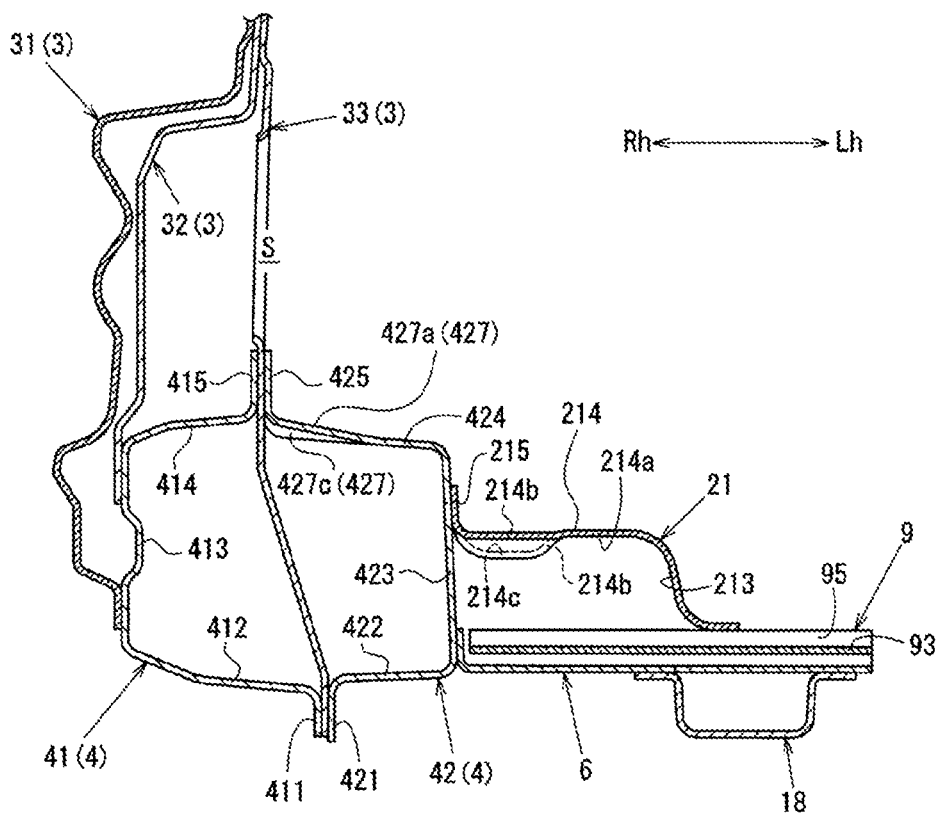
FIG. 5 is a sectional view taken along line B-B of FIG. 3.

In order to clarify illustrations, an external appearance of the front seat FS is shown by a two-dotted broken line in FIG. 2, and a side sill inner panel 42 is shown by a broken line in FIG. 5. In figures, arrows Fr, Rr show a longitudinal direction, the arrow Fr showing a forward side and the arrow Rr showing a rearward side.

Further, arrows Rh, Lh show a lateral direction, the arrow Rh showing a rightward side and the arrow Lh showing a leftward side. An inside of a cabin means an inward side in the vehicle width direction, and an outside of the vehicle means an outward side in the vehicle width direction. In addition, an upper side of FIG. 1 means an upward side in a vehicle vertical direction, and a lower side of FIG. 1 means a downward side in the vehicle vertical direction.

The automotive vehicle 1 of the present embodiment is configured, as shown in FIG. 1, such that a frame of a lower vehicle body thereof is constituted by a pair of right-and-left hinge pillars 2 which support front doors (not illustrated) so as to open/close the front doors for passenger's ingress/egress, a pair of right-and-left center pillars 3 which support rear doors (not illustrated) so as to open/close the rear doors, a pair of right-and-left side sills 4 which lower portions of the hinge pillars 2 and lower portions of the center pillars 3 are joined to and extend in the vehicle longitudinal direction, and a pair of right-and-left rear side frames 5 which extend rearward from rear ends of the side sills 4.

Further, the automotive vehicle 1 is configured, as shown in FIG. 1, such that a partition wall which partitions the cabin from the outside of the vehicle is constituted by a floor panel 6 which forms a floor face of the cabin between the right-and-left side sills 4 and a rear floor panel 7 which forms a floor face of a baggage room between the right-and-left rear side frames 5.

Additionally, as shown in FIG. 1, the automotive vehicle 1 comprises a first cross member 8, a second cross member 9, a third cross member 10, and a fourth cross member 11, which are arranged, in order from a vehicle forward side, on an upper face of the floor panel 6 between the right-and-left side sills 4 and also between the right-and-left rear side frames 5 as reinforcing members to reinforce a frame of the lower vehicle body.

Moreover, the automotive vehicle 1 is configured, as shown in FIG. 2, such that the front seat FS for seating of a passenger is installed via a pair of right-and-left seat rails SR which extend between the first cross member 8 and the second cross member 9. The front seat FS comprises a seat frame W which is slidably, in the vehicle longitudinal direction, supported at the seat rails SR, an urethane cushion (not illustrated) which is attached to the seat frame W, a seat skin (not illustrated), and others.

Herein, a right-side part of the automotive vehicle 1 is symmetrical to a left-side part, so a vehicle-body structure of the right-side part of the vehicle will be described mainly and specific description of the left-side part of the vehicle is omitted.

The hinge pillar 2 has a closed cross section extending in the vehicle vertical direction, which is not illustrated, and its lower portion is joined to a front end of the side sill 4. The center pillar 3 is configured such that a width, in the vehicle longitudinal direction, thereof becomes gradually larger toward its lower part as shown in FIGS. 1 and 4.

As shown in FIGS. 3 and 5, the center pillar 3 comprises a side frame outer panel 31, a center pillar outer panel 32, and a center pillar inner panel 22, which are joined from the outward side in this order in a vertical section along the vehicle width direction.

As shown in FIGS. 3 and 5, the side frame outer panel 31 is a panel member which forms an exterior design face of the automotive vehicle 1, and its lower end is joined to an outward-side side face (an outer side face portion 413, which is described later), in the vehicle width direction, of the side sill 4.

The center pillar outer panel 32 is a panel member which extends in the vehicle vertical direction, which forms a closed cross section extending in the vehicle vertical direction together with the center pillar inner panel 33, as shown in FIGS. 3 and 5.

Herein, a lower end of the center pillar outer panel 32 is joined to a side face (the outer side face portion 413) at a position which is located above a lower end of the side frame outer panel 31.

The center pillar inner panel 33 is, as shown in FIGS. 3 and 5, a panel member extending in the vehicle vertical direction, and forms a closed cross section extending in the vehicle vertical direction together with the center pillar outer panel 32. The center pillar inner panel 33 has an opening portion S which is formed at a position located above the side sill 4 in the side view.

Further, as shown in FIG. 5, the side sill 4 comprises a side sill outer panel 41 which is positioned on the outward side and extends in the vehicle longitudinal direction and a side sill inner panel 42 which is positioned on the inward side and extends in the vehicle longitudinal direction. The panels 41, 42 are provided such that the center pillar inner panel 33 is interposed between these panels.

As shown in FIG. 5, the side sill outer panel 41 is configured to have a hat-shaped cross section such that it protrudes outward, and forms a roughly-rectangular closed cross section together with the center pillar inner panel 33.

Specifically, as shown in FIG. 5, the side sill outer panel 41 comprises an outer lower-side flange portion 411 which is joined to a lower end of the center pillar inner panel 33, an outer lower face portion 412 which extends outward from an upper edge of the outer lower-side flange portion 411, an outer side face portion 413 which extends upward from an outward-side edge portion of the outer lower face 412, an outer upper face portion 414 which extends inward from an upper end of the outer side face portion 413, and an outer upper-side flange portion 415 which extends upward from an inward-side edge portion of the outer upper face portion 414 and is joined to the center pillar inner panel 33, which are formed integrally.

Meanwhile, as shown in FIG. 5, the side sill inner panel 42 is configured to have a hat-shaped cross section such that it protrudes inward, and forms a roughly-rectangular closed cross section together with the center pillar inner panel 33.

Specifically, as shown in FIG. 5, the side sill inner panel 42 comprises an inner lower-side flange portion 421 which is joined to the outer lower-side flange portion 411 via the center pillar inner panel 33, an inner lower face portion 422 which extends inward from an upper edge of the inner lower-side flange portion 421, an inner side face portion 423 which extends upward from an inward-side edge portion of the inner lower face 422, an inner upper face portion 424 which extends outward from an upper end of the inner side face portion 423, and an inner upper-side flange portion 425 which extends upward from an outward-side edge portion of the inner upper face portion 424 and is joined to the outer upper-side flange portion 415 via the center pillar inner panel 33, which are formed integrally.

At the inner upper face portion 424 is provided, as shown in FIGS. 3 through 5, a first protrusion portion 426, a second protrusion portion 427, a third protrusion portion 428, and a fourth protrusion portion 429 which are configured to slant upward and rearward, then slant downward, and protrude such that their outward-side edge portions are positioned above their inward-side edge portions.

As shown in FIGS. 3 and 4, the first protrusion portion 426 is formed substantially at the same longitudinal position as a front end of the lower portion of the center pillar 3 and configured in a roughly trapezoidal shape in the plan view such that its inward side has a shorter side. Specifically, the first protrusion portion 426 comprises a central slant portion 426a which has a roughly rectangular shape in the plan view, a front-side slant portion 426b which is positioned in front of the central slant portion 426a, and a rear-side slant portion 426c which is positioned in back of the central slant portion 426a.

The central slant portion 426a is configured to slant outward and upward from a position which is spaced apart from an inward-side edge portion, in the vehicle width direction, of the inner upper face portion 424. Herein, a longitudinal length of the central slant portion 426a is configured such that this longitudinal length of an inward side of the central slant portion 426a is substantially the same as that of an outward side of the central slant portion 426a.

The front-side slant portion 426b is configured to slant outward and upward, toward an outward-side end portion, in the vehicle width direction, of a front edge of the central slant portion 426a, from the vehicle forward side and have a roughly triangular shape in the plan view.

More specifically, the front-side slant portion 426b is formed in the roughly triangular shape in the plan view such that a bottom side of this triangular shape corresponds to an edge side which extends forward and outward from an inward-side end portion, in the vehicle width direction, of the front edge of the central slant portion 426a and an apex of this triangular shape corresponds to the outward-side end portion, in the vehicle width direction, of the front edge of the central slant portion 426a.

The rear-side slant portion 426c is configured to slant outward and upward, toward an outward-side end portion, in the vehicle width direction, of a rear edge of the central slant portion 426a, from the vehicle rearward side and have a roughly triangular shape in the plan view.

More specifically, the rear-side slant portion 426c is formed in the roughly triangular shape in the plan view such that a bottom side of this triangular shape corresponds to an edge side which extends forward and outward from an inward-side end portion, in the vehicle width direction, of the rear edge of the central slant portion 426a and an apex of this triangular shape corresponds to the outward-side end portion, in the vehicle width direction, of the rear edge of the central slant portion 426a.

As shown in FIGS. 3 through 5, the second protrusion portion 427 is configured in a roughly trapezoidal shape in the plan view such that a short side of this trapezoidal shape corresponds to an inward side of the second protrusion portion 427 which is located substantially at the same position, in the vehicle longitudinal direction, as a roughly central portion, in the vehicle longitudinal direction, of the lower portion of the center pillar 3.

Similarly to the first protrusion portion 426, the second protrusion portion 427 comprises a central slant portion 427a which has a roughly rectangular shape in the plan view, a front-side slant portion 427b which is positioned in front of the central slant portion 427a, and a rear-side slant portion 427c which is positioned in back of the central slant portion 427a, and this second protrusion portion 427 is formed in a roughly trapezoidal shape in the plan view.

Herein, the second protrusion portion 427 is configured such that a short side portion of this trapezoidal shape of the second protrusion portion 427 is positioned slightly on an outward side, in the vehicle width direction, of the short side portion of the first protrusion portion 426 and the length, in the vehicle longitudinal length of the central slant portion 427a is shorter than that of the central slant portion 426a of the first protrusion portion 426.

As shown in FIGS. 3 and 4, the third protrusion portion 428 is configured in a roughly trapezoidal shape in the plan view such that a short side of this trapezoidal shape corresponds to an inward side of the third protrusion portion 428, which is located at a position which is spaced slightly rearward apart from the second protrusion portion 427.

The third protrusion portion 428 has substantially the same size as the second protrusion portion 427, and the third protrusion portion 428 comprises, similarly to the first protrusion portion 426, a central slant portion 428a which has a roughly rectangular shape in the plan view, a front-side slant portion 428b which is positioned in front of the central slant portion 428a, and a rear-side slant portion 428c which is positioned in back of the central slant portion 428a. This third protrusion portion 428 is formed in a roughly trapezoidal shape in the plan view.

As shown in FIGS. 3 and 4, the fourth protrusion portion 429 is configured in a roughly trapezoidal shape in the plan view such that a short side of this trapezoidal shape corresponds to an inward side of the fourth protrusion portion 429, which is located substantially at the same position, in the longitudinal direction, as a rear end of the lower portion of the center pillar 3.

The fourth protrusion portion 429 has substantially the same size as the first protrusion portion 426, and the fourth protrusion portion 429 comprises, similarly to the first protrusion portion 426, a central slant portion 429a which has a roughly rectangular shape in the plan view, a front-side slant portion 429b which is positioned in front of the central slant portion 429a, and a rear-side slant portion 429c which is positioned in back of the central slant portion 429a. This fourth protrusion portion 429 is formed in a roughly trapezoidal shape in the plan view.

According to the above-described structure, the side sill inner panel 42 is configured, as shown in FIG. 4, such that a border line of a corner portion between the inner side face portion 423 and the inner upper face portion 424 straightly extends in the vehicle longitudinal direction and a border line of another corner portion between the inner upper face portion 424 and the inner upper-side flange portion 425 forms a ridgeline having an uneven (convex/concave) shape.

Further, as shown in FIGS. 4 and 6, inside the side sill 4 having the above-described structure, a front-side reinforcing member 12 and a rear-side reinforcing member 13 which extend in the vehicle longitudinal direction and reinforce the side sill 4, and a first gusset member 14, a second gusset member 15, a third gusset member 16, and a fourth gusset member 17 which partition an inner space formed by the center pillar inner panel 33 and the side sill inner panel 42 into plural portions in the vehicle longitudinal direction are joined to the side sill inner panel 42.

The front-side reinforcing member 12 comprises, as shown in FIG. 6, an upper face portion 12a which is formed in a roughly flat-plate shape and joined to the inner upper face portion 424 and a vertical wall portion 12b which is formed in a roughly flat-plate shape and joined to the inner side face portion 423, which is configured to have a roughly L-shaped cross section in a vertical section along the vehicle width direction. This front-side reinforcing member 12 is, as shown in FIG. 4, joined to the side sill inner panel 42 such that a rear end thereof is positioned near the front end of the lower portion of the center pillar 3.

Meanwhile, the rear-side reinforcing member 13 comprises, as shown in FIG. 6, an upper face portion 13*a* which is formed in a roughly flat-plate shape and joined to the inner upper face portion 424 and a vertical wall portion 13*b* which is formed in a roughly flat-plate shape and joined to the inner side face portion 423, which is configured to have a roughly L-shaped cross section in a vertical section along the vehicle width direction. This rear-side reinforcing member 13 is, as shown in FIG. 4, joined to the side sill inner panel 42 such that a front end thereof is positioned in front of the rear end of the lower portion of the center pillar 3 and between the third protrusion portion 427 and the fourth protrusion portion 428.

As shown in FIGS. 4 and 6, the first gusset member 14 is provided substantially at the same position, in the vehicle longitudinal direction, as the first protrusion portion 426 of the side sill inner panel 42. This first gusset member 14 comprises, as shown in FIG. 6, a roughly flat-plate shaped body portion which has a specified thickness in the vehicle longitudinal direction, an inward-side flange portion which extends forward from an inward-side edge portion of the body portion, and an upper-side flange portion which extends forward from an upper end of the body portion, which are formed integrally.

Further, the first gusset member 14 is joined to the inner side face portion 423 of the side sill inner panel 42 at its inward-side flange portion as shown in a circle illustrated by a broken line in FIG. 6, and the upper-side flange portion is joined to the central slant portion 426*a* of the first protrusion portion 426.

As shown in FIGS. 4 and 6, the second gusset member 15 is arranged substantially at the same position, in the vehicle longitudinal direction, of a front end of the second cross member 9 which will be described later. This second gusset member 15 comprises, as shown in FIG. 6, a roughly flat-plate shaped body portion which has a specified thickness in the vehicle longitudinal direction, an inward-side flange portion which extends forward from an inward-side edge portion of the body portion, and an upper-side flange portion which extends forward from an upper end of the body portion, which are formed integrally.

Further, the second gusset member 15 is joined to the inner side face portion 423 of the side sill inner panel 42 at its inward-side flange portion as shown in a circle illustrated by a broken line in FIG. 6, and the upper-side flange portion is joined to the inner upper face portion 424.

The third gusset member 16 is, as shown in FIGS. 4 and 6, arranged between the second protrusion portion 427 and the third protrusion portion 428 of the side sill inner panel 42. This third gusset member 16 comprises, as shown in FIG. 6, a roughly flat-plate shaped body portion which has a specified thickness in the vehicle longitudinal direction, an inward-side flange portion which extends rearward from an inward-side edge portion of the body portion, and an upper-side flange portion which extends rearward from an upper end of the body portion, which are formed integrally.

Further, this third gusset member 16 is joined to the inner side face portion 423 of the side sill inner panel 42 at its inward-side flange portion as shown in a circle illustrated by a broken line in FIG. 6, and the upper-side flange portion is joined to the inner upper face portion 424 between the second protrusion portion 427 and the third protrusion portion 428.

The fourth gusset member 17 is, as shown in FIGS. 4 and 6, arranged substantially at the same position, in the vehicle longitudinal direction, as the fourth protrusion portion 429 of the side sill inner panel 42. This fourth gusset member 17 comprises, as shown in FIG. 6, a roughly flat-plate shaped body portion which has a specified thickness in the vehicle longitudinal direction, an inward-side flange portion which extends rearward from an inward-side edge portion of the body portion, and an upper-side flange portion which extends rearward from an upper end of the body portion, which are formed integrally.

Further, this fourth gusset member 17 is joined to the inner side face portion 423 of the side sill inner panel 42 at its inward-side flange portion as shown in a circle illustrated by a broken line in FIG. 6, and the upper-side flange portion is joined to the central slant portion 429*a* of the fourth protrusion portion 429.

Further, the floor panel 6 is configured, as shown in FIG. 1, such that a tunnel portion 6*a* which protrudes upward and extends in the vehicle longitudinal direction is provided substantially at a center, in the vehicle width direction, of the vehicle body. This floor panel 6 is joined to the side sill inner panel 42 of the side sill 4 at an outward-side edge side, in the vehicle width direction, thereof.

Moreover, a floor frame 18 which extends substantially in the vehicle longitudinal direction such that its front end is positioned on the outward side and its rear end is positioned on the inward side in the vehicle width direction is joined to a lower face of the floor panel 6 as shown in FIGS. 1 and 5. Herein, the floor frame 18 is configured to have a hat-shaped cross section which opens upward in the vertical section along the vehicle width direction.

As shown in FIG. 1, the first cross member 8 is arranged on an upper face of the floor panel 6, interconnecting the right-and-left side sills 4 via the tunnel portion 6*a*, substantially at a central position, in the vehicle longitudinal direction, of the vehicle body between the hinge pillar 2 and the center pillar 3.

The first cross member 8 is configured to have a roughly hat-shaped cross section in the vertical section along the vehicle longitudinal direction such that it protrudes upward and forms an eggplant-shaped closed cross section extending in the vehicle width direction together with the floor panel 6, specific illustration of which is omitted. Herein, front ends of the pair of right-and-left seat rails SR which support the front seat FS are fixedly fastened to the upper face portion of the first cross member 8 (see FIG. 2).

As shown in FIGS. 1 and 3, the second cross member 9 is arranged on the upper face of the floor panel 6, interconnecting the right-and-left side sills 4 via the tunnel portion 6*a*, substantially at a center position, in the vehicle longitudinal direction, of the center pillar 3, more specifically, substantially at the same position, in the vehicle longitudinal direction, as the second protrusion portion 427 of the side sill inner panel 42. Herein, the second cross member 9 is joined to a portion of the floor panel 6 which slants rearward and downward at its lower face.

As shown in FIGS. 4 and 7, the second cross member 9 is configured to have a roughly M-shaped cross section in the vertical section along the vehicle longitudinal direction, and comprises a front-side flange portion 91 which is positioned at the vehicle forward side and joined to the floor panel 6, a rear-side flange portion 92 which is positioned at the vehicle rearward side and joined to the floor panel 6, a central flange portion 93 which is positioned between the front-side flange portion 91 and the rear-side flange portion 92, a front-side protrusion portion 94 which is provided to protrude upward between the front-side flange portion 91 and the central flange portion 92, and a rear-side protrusion portion 95 which is provided to protrude upward between the central flange portion 93 and the rear-side flange portion 92, which are formed integrally.

The above-described second cross member 9 is, as shown in FIG. 4, joined to the upper face of the floor panel 6 such that the central flange portion 93 is located substantially at the same position, in the vehicle longitudinal direction, as the second protrusion portion 427 of the side sill inner panel 42.

Further, as shown in FIG. 1, the second cross member 9 is connected to the side sill 4 via a first seat-attaching bracket 21 which is positioned at the outward side, in the vehicle width direction, of the vehicle body and connected to the tunnel portion 6a via a second seat-attaching bracket 22 which is positioned at the inward side, in the vehicle width direction, of the vehicle body. Herein, rear ends of the pair of right-and-left seat rails SR which support the front seat FS are fixedly fastened to the first seat-attaching bracket 21 and the second seat-attaching bracket 22 (see FIG. 2).

As shown in FIG. 1, the third cross member 10 is arranged on the upper face of the floor panel 6 such that it interconnects the side sills 4 in the vehicle width direction at a position near the rear end of the floor panel 6.

As shown in FIG. 1, the fourth cross member 11 is arranged on the upper face of the floor panel 6 such that it interconnects the rear side frames 54 in the vehicle width direction at a position which is spaced rearward apart from the third cross member 10. The fourth cross member 11 is joined to the rear side frames 5 and the rear floor panel 7.

Herein, the above-described first seat-attaching bracket 21 will be described. Herein, the second seat-attaching bracket 22 is substantially symmetrical to the first seat-attaching bracket 21 except a structure where the flange portion is joined to the tunnel portion 6a, and therefore specific description of this bracket 22 is omitted.

As shown in FIGS. 5 through 7, the first seat-attaching bracket 21 is configured in a roughly boxy shape which opens outward and downward, and its vertical section along the vehicle longitudinal direction forms a closed cross section together with the second cross member 9.

The first seat-attaching bracket 21 is configured such that its front end is located substantially at the same position, in the vehicle longitudinal direction, as the second gusset member 15 and its rear end is located substantially at the same position, in the vehicle longitudinal direction, as the third gusset member 16.

More specifically, the first seat-attaching bracket 21 comprises, as shown in FIGS. 3 through 7, a front wall portion 211 which is positioned at the forward side of the vehicle body, a rear wall portion 212 which is provided rearward to face the front wall portion 211, a side wall portion 213 which connects an inward-side edge portion of the front wall portion 211 and an inward-side edge portion of the rear wall portion 212, an upper wall portion 214 which connects an upper end of the front wall portion 211 and an upper end of the rear wall portion 212, and a flange portion 215 which is joined to the side sill 4, which are formed integrally.

The front wall portion 211 is configured in a roughly flat-plate shape and slightly slants such that its lower end is positioned in front of its upper end. This front wall portion 211 is joined to the front-side flange portion 91 of the second cross member 9 at a portion thereof which extends from its lower end.

The rear wall portion 212 is configured in a roughly flat-plate shape and slightly slants such that its lower end is positioned in back of its upper end. This rear wall portion 212 is joined to a rear face of the rear-side protrusion portion 95 of the second cross member 9 at a portion thereof which extends from its lower end.

The side wall portion 213 is configured in a roughly flat-plate shape and slightly slants such that its lower end is positioned on the inward side, in the vehicle width direction, of its upper end. This side wall portion 213 is joined to an upper face of the front-side protrusion portion 94 and an upper face of the rear-side protrusion portion 95 of the second cross member 9 at a portion thereof which is bent outward from its lower end.

The upper wall portion 214 is, as shown in FIGS. 3 and 5, arranged at the inward side, in the vehicle width direction, of the vehicle body, and comprises an attachment portion 214a which is a plane portion where the rear ends of the seat rails SR are attached, a slant portion 214b (corresponds to a "connection portion" in the claims) which slants outward and downward from an outward-side edge portion of the attachment portion 214a, and a stepped-down portion 214c which extends outward, in the vehicle width direction, from a lower end of the slant portion 214b.

Further, as shown in FIGS. 3 through 7, the stepped-down portion 214c has a bead 214d which protrudes roughly upward at a roughly central position, in the vehicle longitudinal direction, thereof and extends in the vehicle width direction from the slant portion 214b to the flange portion 215.

More specifically, the bead 214d is provided to protrude roughly upward along an imaginary line which extends from the central flange portion 93 of the second cross member 9 toward the second protrusion portion 427 of the side sill inner panel 42 as shown in FIG. 4.

In other words, the second protrusion portion 427 of the side sill inner panel 42, the central flange portion 93 of the second cross member 9, and the bead 214d of the first seat-attaching bracket 21 are provided substantially at the same position in the vehicle longitudinal direction. Herein, the bead 214d protrudes such that its top portion is located at a slightly lower level than an upper face of the attachment portion 214a.

As shown in FIG. 4, the flange portion 215 is integrally formed, in a side view, by connecting a portion 215A which extends forward from an outward-side edge portion, in the vehicle width direction, of the front wall portion 211, a portion 215B which extends rearward from an outward-side edge portion, in the vehicle width direction, of the rear wall portion 212, and a portion 215C which extends upward from an outward-side edge portion, in the vehicle width direction, of the upper wall portion 214.

The above-described first seat-attaching bracket 21 is joined to the inner side face portion 423 of the side sill inner panel 42 via a front-side joint point 215a, a rear-side joint point 215b, and a middle joint point 215c which is positioned above the joint points 215a, 215b of the flange portion 215 as shown by circles illustrated by a broken line in FIG. 4.

The front-side joint point 215a is provided at the portion 215A of the flange portion 215 which extends forward from the front wall portion 211 in the side view as shown in FIG. 4. The first seat-attaching bracket 21 is joined to the inner side face portion 423 of the side sill inner panel 42 at the front-side joint point 215a of the flange portion 215, and joined to the second gusset member 15 via the inner side face portion 423.

As shown in FIG. 4, the rear-side joint point 215b is provided at the portion 215B of the flange portion 215 which extends rearward from the rear wall portion 212 in the side view. Herein, the rear-side joint point 215b is located at a slightly lower level than the front-side joint point 215a.

The first seat-attaching bracket 21 is joined to the inner side face portion 423 of the side sill inner panel 42 at the rear-side joint point 215b of the flange portion 215, and joined to the third gusset member 16 via the inner side face portion 423.

As shown in FIG. 4, the middle joint point 215c is provided at the portion 215C of the flange portion 215 which extends upward from the upper wall portion 214 in the side view. The first seat-attaching bracket 21 is, as shown in FIGS. 4 and 6, joined to the inner face portion 423 of the side sill inner panel 42 between the second gusset member 15 and the third gusset member 16 at the middle joint point 215c of the flange portion 215.

The above-described low vehicle-body structure of the automotive vehicle 1 can improve the surface rigidity of the upper wall portion 214 of the first seat-attaching bracket 21, without deteriorating its serving as the load transmission path where the side-collision load from the vehicle side is transmitted.

Specifically, since the slant portion 214b is provided at the upper wall portion 214, the lower vehicle-body structure of the automotive vehicle 1 is configured such that an area of the attachment portion 214a and an area of the stepped-down portion 214c can be made respectively small and also the slant portion 214b can be made to serve as a knot for the upper wall portion 214, so that deformation of the upper wall portion 214 which may be caused by the vibration of the vehicle body during the vehicle traveling can be suppressed properly.

Further, since the bead 214b which extends in the vehicle width direction is provided at the stepped-down portion 214c, the lower vehicle-body structure of the automotive vehicle 1 is configured such that the surface rigidity of the stepped-down portion 214c against the vehicle-body vibration can be improved and also the support rigidity of the attachment portion 214a can be improved.

Thereby, the surface rigidity of the upper wall portion 214 of the first seat-attaching bracket 21 can be improved, compared to the roughly flat-plate shaped upper wall portion 214. Accordingly, when the automotive vehicle 1 rides over the slope, for example, it can be prevented that the upper wall portion 214 of the first seat-attaching bracket 21 starts its deformation caused by the vehicle-body vibration in an early stage and also the damping performance of the urethane cushion forming the seat can be sufficiently achieved.

Herein, since swinging of the seat in the vehicle vertical direction and in the vehicle longitudinal direction can be suppressed by improvement of the surface rigidity of the upper wall portion 214, swinging of the head portion of the passenger is so suppressed that the ride comfort of the passenger can be improved.

Additionally, since the bead 214d provided at the stepped-down portion 214c is provided to extend from the slant portion 214b toward the side sill 4, the rigidity of a border between the stepped-down portion 214c and the slant portion 214b against the side-collision load can be improved.

Therefore, when the side-collision load is applied to the first seat-attaching bracket 21, it can be prevented by the bead 214d provided at the stepped-down portion 214c that the seat-attaching bracket 21 is bent and deformed with a starting point at the slant portion 214b.

Thus, the low vehicle-body structure of the automotive vehicle 1 can improve the surface rigidity of the upper wall portion 214 of the first seat-attaching bracket 21, without deteriorating its serving as the load transmission path where the side-collision load from the vehicle side is transmitted.

Further, since the second cross member 9 is configured to have the roughly M-shaped cross section, in the vertical section along the vehicle longitudinal direction, such that it forms the closed cross section together with the first seat-attaching bracket 21, a large sectional area of the load transmission path at the stepped-down portion 214c can be secured. Therefore, the rigidity of the load transmission path against the side-collision load from the vehicle side can be improved.

Thus, the low vehicle-body structure of the automotive vehicle 1 can improve the surface rigidity of the upper wall portion 214 of the first seat-attaching bracket 21 and the rigidity of the load transmission path where the side-collision load from the vehicle side is transmitted.

Further, since the inner upper face portion 424 of the side sill 4 has the second protrusion portion 427 which protrudes toward the outward side from the inward side, in the vehicle width direction, of the vehicle substantially at the same position, in the vehicle longitudinal direction, as the bead 214d, the lower vehicle-body structure of the automotive vehicle 1 can improve the rigidity of the inner upper face portion 424 of the side sill 4 against the side-collision load.

Moreover, since the second protrusion portion 427 of the side sill 4 and the bead 214d of the first seat-attaching bracket 21 are located substantially at the same position in the vehicle longitudinal direction, the rigidity of the load transmission path where the collision load is transmitted can be further improved.

Thus, the low vehicle-body structure of the automotive vehicle 1 can improve the surface rigidity of the upper wall portion 214 of the first seat-attaching bracket 21 and also securely improve the rigidity of the load transmission path where the side-collision load from the vehicle side is transmitted.

Also, since the position of the middle joint point 215c as the joint point of the side sill 4 and the flange portion 215 is, in the side view, located at the higher level than the position of the front-side joint point 215a as the joint point of the second gusset member 15 and the flange portion 215 and the position of the rear-side joint point 215b as the joint point of the third gusset member 16 and the flange portion 215, the lower vehicle-body structure of the automotive vehicle 1 can form a roughly-triangular imaginary plane which is made by connecting the front-side joint point 215a, the rear-side joint point 215b, and the middle joint point 215c.

Accordingly, when the side-collision load is transmitted from the side sill 4 to the first seat-attaching bracket 21, for example, the side-collision load can be transmitted via the roughly-triangular imaginary plane.

Thereby, deformation of the flange portion 215 which may be caused by the side-collision load can be suppressed more properly, compared to a case where the side sill 4 and the first seat-attaching bracket 21 are joined at two joint points.

Thus, the low vehicle-body structure of the automotive vehicle 1 can improve the surface rigidity of the upper wall portion 214 of the first seat-attaching bracket 21 and the rigidity of the load transmission path where the side-collision load from the vehicle side is transmitted by joining the side sill 4 and the flange portion 215 at the position located at the higher level than the front-side joint point 215*a* and the rear-side joint point 215*b*.

Moreover, since the first seat-attaching bracket 21 comprises the single flange portion 215 which is integrally formed by connecting the portion 135A which extends forward from the outward-side edge portion of the front wall portion 211, the portion 135B which extends rearward from the outward-side edge portion of the rear wall portion 212, and the portion 135C which extends upward from the outward-side edge portion of the upper wall portion 214, the lower vehicle-body structure of the automotive vehicle 1 can improve the rigidity of the flange portion 215 of the first seat-attaching bracket 21 and improve the connection strength of the first seat-attaching bracket 21 and the side sill 4.

Further, the portion 215A which extends forward from the outward-side edge portion of the front wall portion 211, the portion 215B which extends rearward from the outward-side edge portion of the rear wall portion 212, and the portion 215C which extends upward from the outward-side edge portion of the upper wall portion 214 can support the upper wall portion 214 of the first seat-attaching bracket 21.

Accordingly, in a state where the first seat-attaching bracket 21 is joined to the side sill 4, the flange portion 215 can support the upper wall portion 214 more securely, compared to a case where the upper wall portion 214 is supported only by the portion which extends upward from the outward-side edge portion of the upper wall portion 214.

Thereby, the deformation of the upper wall portion 214 which may be caused by the vehicle-body vibration during the vehicle traveling can be suppressed more securely. Thus, the low vehicle-body structure of the automotive vehicle 1 can more securely improve the surface rigidity of the upper wall portion 214 of the first seat-attaching bracket 21 by providing the single flange portion 215.

Embodiment 2

Next, a second embodiment of the lower vehicle-body structure of the automotive vehicle 1 in which the shape of the side sill inner panel 42 of the side sill 4 and the shape of the first seat-attaching bracket 21 are respectively different from those of the above-described lower vehicle-body structure of the automotive vehicle 1 of the first embodiment will be described specifically referring to FIGS. 8 through 11.

Figure 8:
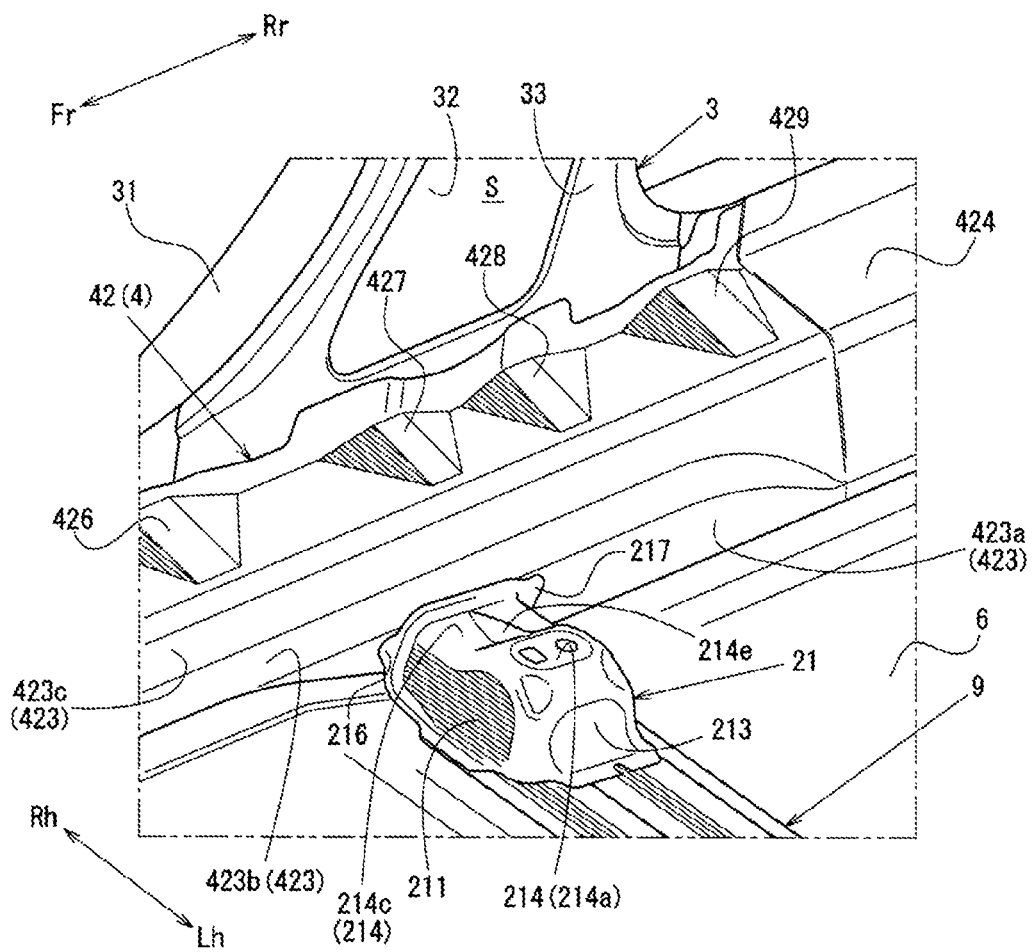
FIG. 8 is a perspective view showing an external appearance of a lower vehicle body of a second embodiment.
Figure 9:
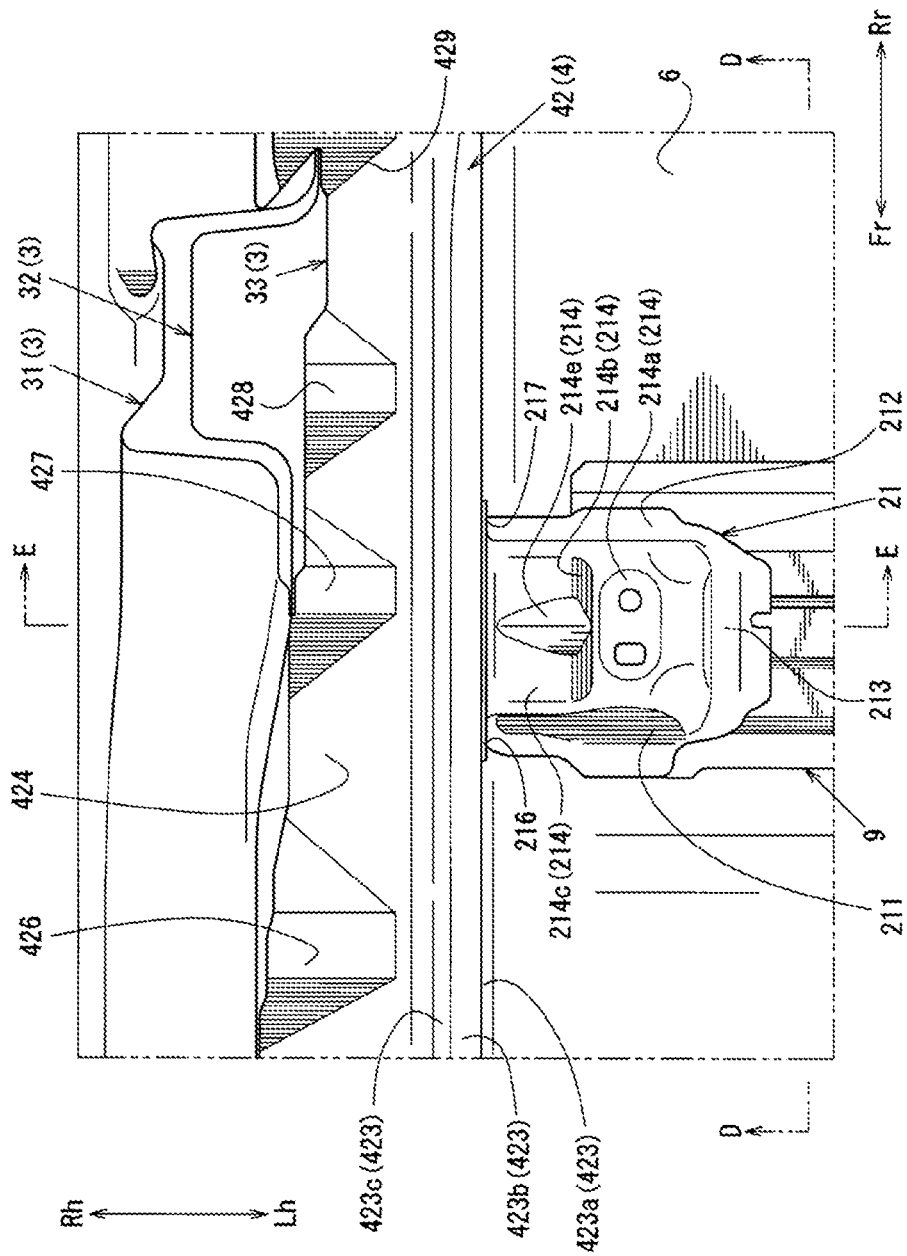
FIG. 9 is a plan view showing a part of the lower vehicle body of the second embodiment near the center pillar.
Figure 10:
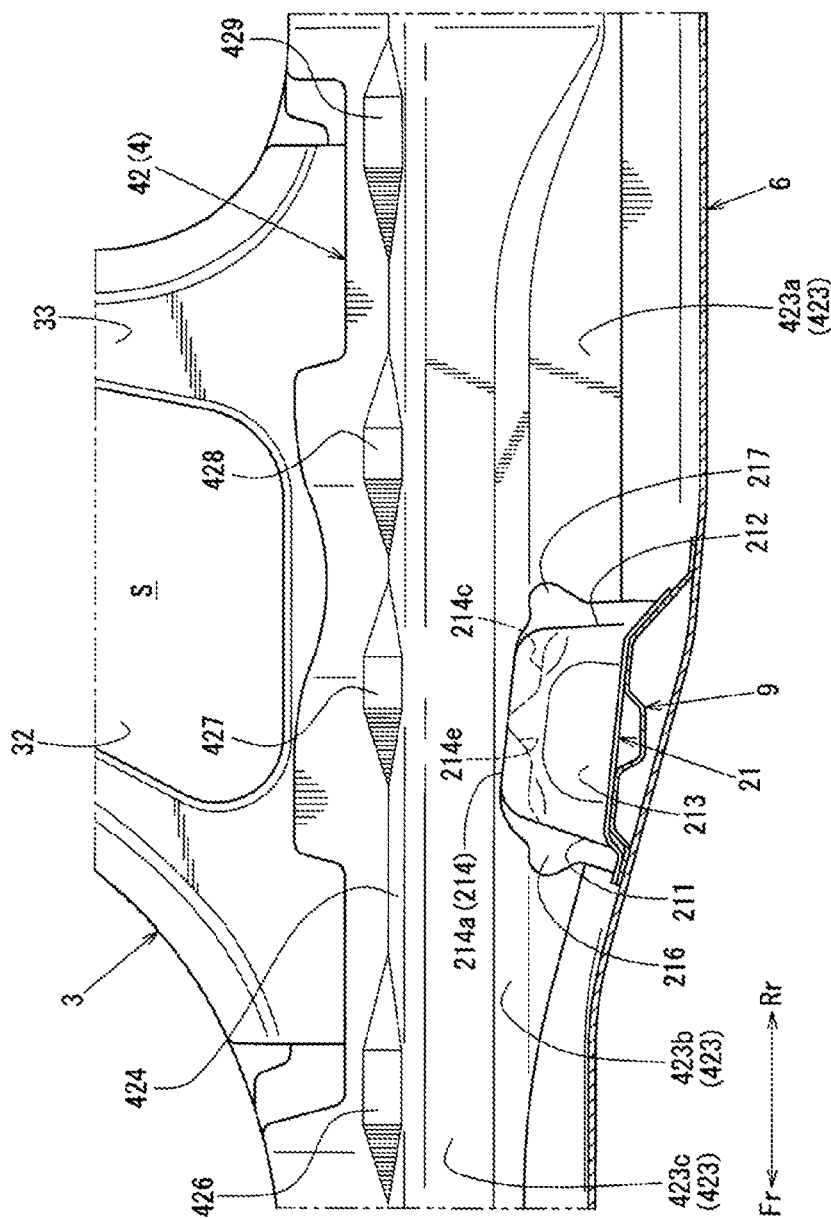
FIG. 10 is a side view showing a side face of the part of the lower vehicle body taken along line D-D of FIG. 9.
Figure 11:
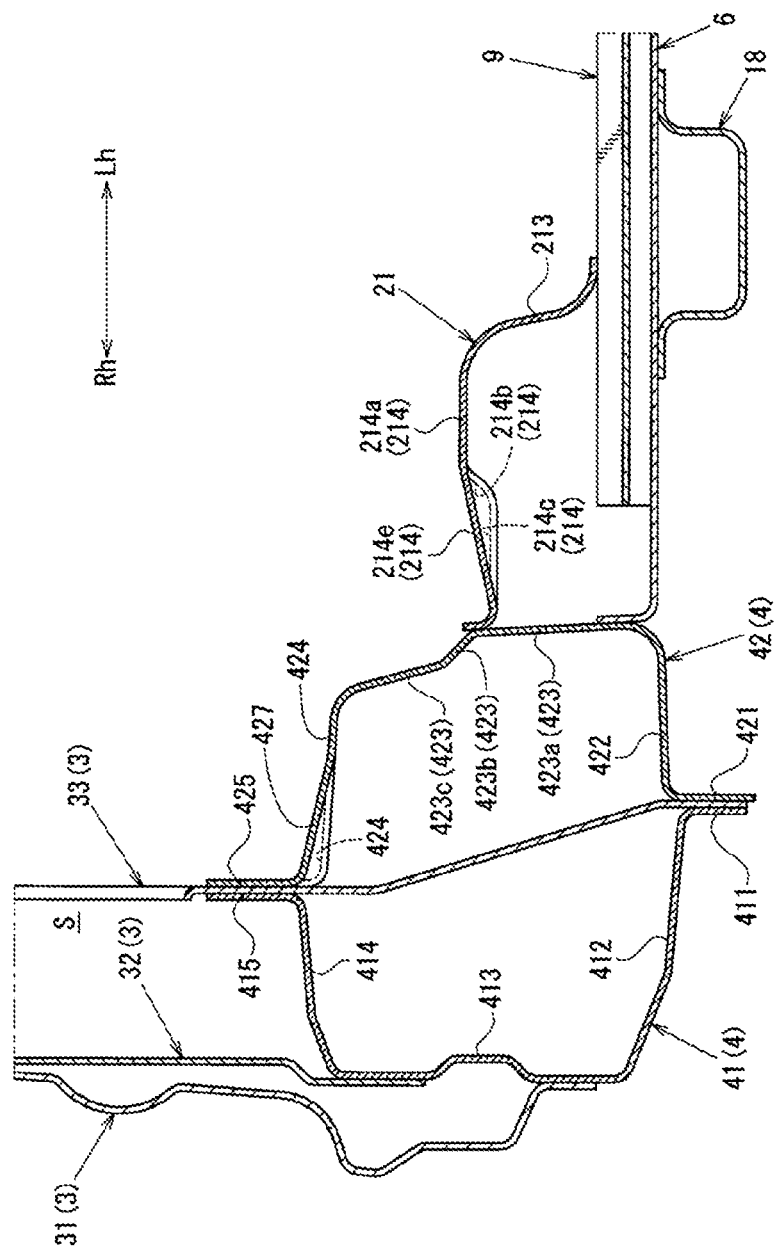
FIG. 11 is a sectional view taken along line E-E of FIG. 9.

Herein, FIG. 8 is a perspective view showing an external appearance of the lower vehicle body of the second embodiment, FIG. 9 is a plan view showing a part of the lower vehicle body of the second embodiment near the center pillar 3, FIG. 10 is a side view showing a side face of the part of the lower vehicle body taken along line D-D of FIG. 9, and FIG. 11 is a sectional view taken along line E-E of FIG. 9. The same structures as the first embodiment are denoted by the same reference characters, specific descriptions of which are omitted.

First, similarly to the above-described first embodiment, the side sill inner panel 42 of the side sill 4 comprises the inner lower-side flange portion 421, the inner lower face portion 422, the inner upper face portion 424, and the inner upper-side flange portion 425, which are formed integrally. Herein, while the inner side face portion 423 of the side sill inner panel 42 of the first embodiment is configured in the roughly flat-plate shape, the inner side face portion 423 of the second embodiment is configured in a stepped shape which is offset in the vehicle width direction.

More specifically, the inner side face portion 423 comprises, as shown in FIGS. 8 through 11, a roughly flat-plate shaped lower portion 423*a* to which the floor panel 6 and the first seat-attaching bracket 21 are joined, a slant portion 423*b* which is configured such that its upper end is positioned on the outward side of its lower end, and a roughly flat-plate shaped upper portion 423*c* which is provided via the slant portion 423*b* such that it is offset outward and upward from the lower portion 423*a*, which are formed integrally.

Herein, the inner side face portion 423 is configured in the side view, as shown in FIG. 10, such that an upper end of the lower portion 423*a* extends substantially straightly in the vehicle longitudinal direction from the vehicle forward side to the fourth protrusion portion 429 and then the upper end of the lower portion 423*a* goes gradually downward as going rearward from the vicinity of a front end of the fourth protrusion portion 429. The inner side face portion 423 is configured in a roughly flat-plate shape such that the upper portion 423*c* joins to the lower portion 423*a* at a point located in back of the fourth protrusion portion 429.

As shown in FIG. 11, the lower portion 423*a* extends upward and slightly outward from an inward-side edge portion of the inner lower face portion 422 in a vertical section along the vehicle width direction which passes a bead 214*e*. This lower portion 423*a* extends to a position located slightly above the stepped-down portion 214*c* of the first seat-attaching bracket 21 in the vehicle vertical direction.

The slant portion 423*b* extends upward and outward from the upper end of the lower portion 423*a* in the vertical section along the vehicle width direction as shown in FIG. 11. The upper portion 423*c* extends upward and slightly outward from an upper end of the slant portion 423*b*, and an upper end of the upper portion 423*c* is connected to an inward-side edge portion of the inner upper face portion 424 as shown in FIG. 11.

The first seat-attaching bracket 21 of the second embodiment is configured such that the shape of the flange portion and the shape of the bead 214*e* of the stepped-down portion 214*c* are respectively different from those of the first seat-attaching bracket 21 of the first embodiment. Specifically, as shown in FIGS. 8 and 10, the first seat-attaching bracket 21 comprises the front wall portion 211, the rear wall portion 212, the side wall portion 213, the upper wall portion 214, and a front flange portion 216 which extends forward from an outward-side edge portion of the front wall portion 211, and a rear flange portion 217 which extends rearward from an outward-side edge portion of the rear wall portion 212, which are formed integrally.

Further, as shown in FIGS. 9 through 11, the upper wall portion 214 comprises, similarly to the first embodiment, the attachment portion 214*a*, the slant portion 214*b*, and the stepped-down portion 214*c* which extends outward from the lower end of the slant portion 214*b*, which are formed integrally. Herein, an outward-side edge portion of the stepped-down portion 214*c* is slightly bent upward along the lower portion 423*a* of the side sill inner panel 42.

Additionally, as shown in FIG. 10, the bead 214*e* which protrudes upward is formed at the stepped-down portion 214*c* along an imaginary line which extends from the central flange portion 93 of the second cross member 9 toward the second protrusion portion 427 of the side sill inner panel 42.

The bead 214*e* is configured in a roughly triangular pyramid shape, as shown in FIGS. 9 and 11, such that a length, in the vehicle longitudinal direction, thereof becomes shorter and a length, in the vehicle vertical direction, thereof from the stepped-down portion 214*c* becomes shorter as advancing outward from the slant portion 214*b*.

Herein, the bead 214e is configured in a vertical section along the vehicle width direction, as shown in FIG. 11, such that its outward-side top portion substantially matches the outward-side edge portion of the stepped-down portion 214c. In other words, the bead 214e is formed in a roughly triangular shape in an elevational view of the vehicle, such that it has a ridgeline which extends from the upper end of the slant portion 21 to the outward-side edge portion of the stepped-down portion 214c.

The above-described first seat-attaching bracket 21 is configured, as shown in FIG. 10, such that the front flange portion 216 is joined to a second gusset member (not illustrated) via the lower portion 423 of the inner side face portion 423 and the rear flange portion 217 is joined to a third gusset member (not illustrated) via the lower portion 423a of the inner side face portion 423.

The above-described lower vehicle-body structure of the automotive vehicle 1 can suppress the deformation of the upper wall portion 214 which may be caused by the vibration of the vehicle body, similarly to the first embodiment. Further, the lower vehicle-body structure of the automotive vehicle 1 can suppress the swinging of the head portion of the passenger, for example, so that that the ride comfort of the passenger can be improved.

Additionally, the lower vehicle-body structure of the automotive vehicle 1 can prevent a border between the stepped-down portion 214c and the slant portion 214b from becoming a fragile (weak) part against the side-collision load by means of the bead 214e. Accordingly, the lower vehicle-body structure of the automotive vehicle 1 can improve the surface rigidity of the upper wall portion 214 of the first seat-attaching bracket 21, without deteriorating its serving as the load transmission path where the side-collision load from the vehicle side is transmitted.

Since the inner side face portion 423 of the side sill 4 comprises the lower portion 423a and the upper portion 423c, the first seat-attaching bracket 21 comprises the front flange portion 216 and the rear flange portion 217, and the bead 214e provided at the first seat-attaching bracket 21 is configured to slant toward the outward-side edge portion, in the vehicle width direction, of the stepped-down portion 214c in the vehicle front view, light weighting of the side sill 4 and improving of the surface rigidity of the upper wall portion 214 of the first seat-attaching bracket 21 can be compatibly achieved.

Specifically, the weight of the side sill 4 can be more reduced by the inner side face portion 432 of the side sill 4 comprising the lower portion 423a and the upper portion 423c which are offset from each other in the vehicle width direction, compared to the weight of the side sill 4 having the roughly flat-plate shaped inner side face portion.

Further, in a case of the first seat-attaching bracket in which a portion extending upward from the outward-side edge portion of the stepped-down portion is configured as a flange and the bead is provided to extend from the connection portion toward this flange, for example, the upper wall portion of the first seat-attaching bracket tends to become a complex structure, so that it may be difficult to secure stable formability.

In particular, in a case where there is provided a flange which is formed integrally by portions which respectively extend from a front end and a rear end of the first seat-attaching bracket and a portion which extends upward from the outward-side edge portion of the stepped-down portion, the first seat-attaching bracket is more complex-structural, so that the stable formability may be difficult to obtain.

According to the present lower vehicle-body structure of the automotive vehicle 1, meanwhile, the upper wall portion 214 of the first seat-attaching bracket 21 can be prevented from becoming the complex structure by the front flange portion 216, the rear flange portion 217, and the bead 214e configured to slant toward the outward-side edge portion of the stepped-down portion 214c, so that the formability of the first seat-attaching bracket 21 can be secured easily.

Thus, the low vehicle-body structure of the automotive vehicle 1 can more stably improve the surface rigidity of the upper wall portion 214 of the first seat-attaching bracket 21, so that light weighting of the side sill 4 and improving of the surface rigidity of the upper wall portion 214 of the first seat-attaching bracket 21 can be compatibly achieved.

In correspondence between the present invention and the above-described embodiments, the seat of the present invention corresponds to the front seat FS of the embodiments. Likewise, the seat-attaching bracket corresponds to the first seat-attaching bracket 21, the seat-attachment portion corresponds to the attachment portion 214a, the connection portion corresponds to the slant portion 214b, the cross member corresponds to the second cross member 9, the upper face portion of the side sill corresponds to the inner upper face portion 424, the protrusion portion corresponds to the second protrusion portion 427, the front gusset member corresponds to the second gusset member 15, the rear gusset member corresponds to the third gusset member 16, the first flange portion corresponds to the portion 215A of the flange portion 215 which extends forward from the outward-side edge portion of the front wall portion 211, the second flange portion corresponds to the portion 215B of the flange portion 215 which extends rearward from the outward-side edge portion of the rear wall portion 212, the third flange portion corresponds to the portion 215C of the flange portion 215 which extends upward from the outward-side edge portion of the upper wall portion 214, the joint point of the side sill and the third flange portion corresponds to the middle joint point 215c, the joint point of the front gusset member and the first flange portion corresponds to the front-side joint point 215a, the joint point of the rear gusset member and the two flange portion corresponds to the rear-side joint point 215b, the single flange portion corresponds to the flange portion 215, and the inward-side side face portion of the side sill corresponds to the inner side face portion 423. However, the present invention is not limited to the above-described embodiments but includes any other embodiments.

For example, while the above-described embodiments adopt the first seat-attaching bracket 21 to which the rear end of the seat rail SR is attached, a seat-attaching bracket to which the front end of the seat rail SR is attached or another seat-attaching bracket to which the front seat FS is directly attached, not via the seat rail SR, may be applied.

Further, while the first seat-attaching bracket 21 is the one to which the seat rail SR of the front seat FS is attached, a middle seat or a rear seat may be attached to this first seat-attaching bracket.

While the second cross member 9 is provided between the floor panel 6 and the first seat-attaching bracket 21, the first seat-attaching bracket 21 may be directly joined to the floor panel 6. Also, while the tunnel portion 6a is provided at the central portion, in the vehicle width direction, of the floor panel 6, a floor panel without any tunnel portion may be used.

While the second cross member 9 is configured such that the shape of its vertical section along the vehicle longitudinal direction is of a roughly M shape, a hat-shaped section may be applied for the second cross member 9.

Further, while the flange portion 215 of the first seat-attaching bracket 21 comprises the portion 215A extending forward from the front wall portion 211, the portion 215B extending rearward from the rear wall portion 212, and the portion 215C extending upward from the upper wall portion 214 which are formed integrally in the above-described first embodiment, respective portions extending from the front wall portion 211, the rear wall portion 212, and the upper wall portion 214 may be formed separately from each other, not integrally.

Also, while the middle joint point 215*c* which is located at the higher level than the front-side joint point 215*a* and the rear-side joint point 215*b* is provided between the front-side joint point 215*a* and the rear-side joint point 215*b* in the above-described first embodiment, this joint point 215*c* may not be necessarily provided between the front-side joint point 215*a* and the rear-side joint point 215*b* as long as it is positioned at the higher level than the front-side joint point 215*a* and the rear-side joint point 215*b*.

Moreover, while the roughly triangular-pyramid shaped bead 214*e* is configured such that the length, in the vehicle longitudinal direction, thereof becomes shorter as advancing outward from the slant portion 214*b* in the above-described second embodiment, this bead may be configured such that its longitudinal length is roughly constant as long as the ridgeline extending from the upper end of the slant portion 214*b* to the outward-side edge portion, in the vehicle width direction, of the stepped-down portion 214*c* is provided.

What is claimed is:

1. A lower vehicle-body structure of an automotive vehicle comprising:
    a pair of right-and-left side sills extending in a vehicle longitudinal direction;
    a floor panel connecting the pair of right-and-left side sills in a vehicle width direction; and
    a seat-attaching bracket connecting to an inward-side, in the vehicle width direction, of the side sill and to the floor panel, and supporting a seat where a passenger is seated, the seat-attaching bracket being provided with an upper wall portion,
    wherein said upper wall portion of the seat-attaching bracket comprises a seat-attachment portion which is positioned at an inward side, in the vehicle width direction, thereof and to which the seat is attached, a stepped-down portion which is positioned at a portion thereof which is located on an outward side, in the vehicle width direction, of said seat-attachment portion and extends toward said side sill, and a connection portion which is connected to an outward-side end, in the vehicle width direction, of said seat-attachment portion at an upper end thereof, extends downward from said upper end, and connected to an inward-side end, in the vehicle width direction, of said stepped-down portion at a lower end thereof, and
    a bead is provided at said stepped-down portion of the upper wall portion of the seat-attaching bracket, the bead being configured to protrude upward and extend from said connection portion toward said side sill in the vehicle width direction and abut, on the inward-side in the vehicle width direction, against the side sill.

2. The lower vehicle-body structure of the automotive vehicle of claim 1, wherein said bead provided at the stepped-down portion of the upper wall portion of the seat-attaching bracket is positioned substantially at a center, in the vehicle longitudinal direction, of said stepped-down portion.

3. The lower vehicle-body structure of the automotive vehicle of claim 1, further comprising a cross member provided between said seat-attaching bracket and said floor panel, wherein the cross member is configured to have a roughly M-shaped cross section, in a vertical section along the vehicle longitudinal direction, such that a portion thereof which corresponds to said bead of the seat-attaching bracket in a vehicle vertical direction protrudes downward and forms a closed cross section together with the seat-attaching bracket.

4. A lower vehicle-body structure of an automotive vehicle comprising:
    a pair of right-and-left side sills extending in a vehicle longitudinal direction;
    a floor panel connecting the pair of right-and-left side sills in a vehicle width direction; and
    a seat-attaching bracket connecting the side sill and the floor panel and supporting a seat where a passenger is seated, the seat-attaching bracket being provided with an upper wall portion,
    wherein said upper wall portion of the seat-attaching bracket comprises a seat-attachment portion which is positioned at an inward side, in the vehicle width direction, thereof and to which the seat is attached, a stepped-down portion which is positioned at a portion thereof which is located on an outward side, in the vehicle width direction, of said seat-attachment portion and extends toward said side sill, and a connection portion which is connected to an outward-side end, in the vehicle width direction, of said seat-attachment portion at an upper end thereof, extends downward from said upper end, and connected to an inward-side end, in the vehicle width direction, of said stepped-down portion at a lower end thereof,
    a bead is provided at said stepped-down portion of the upper wall portion of the seat-attaching bracket, the bead being configured to protrude upward and extend from said connection portion toward said side sill in the vehicle width direction, and
    said side sill is configured such that an upper face portion thereof has a protrusion portion which protrudes toward an outward side from an inward side, in the vehicle width direction, of the vehicle substantially at the same position, in the vehicle longitudinal direction, as said bead.

5. A lower vehicle-body structure of an automotive vehicle comprising:
    a pair of right-and-left side sills extending in a vehicle longitudinal direction;
    a floor panel connecting the pair of right-and-left side sills in a vehicle width direction; and
    a seat-attaching bracket connecting the side sill and the floor panel and supporting a seat where a passenger is seated, the seat-attaching bracket being provided with an upper wall portion,
    wherein said upper wall portion of the seat-attaching bracket comprises a seat-attachment portion which is positioned at an inward side, in the vehicle width direction, thereof and to which the seat is attached, a stepped-down portion which is positioned at a portion thereof which is located on an outward side, in the vehicle width direction, of said seat-attachment portion and extends toward said side sill, and a connection portion which is connected to an outward-side end, in the vehicle width direction, of said seat-attachment portion at an upper end thereof, extends downward from said upper end, and connected to an inward-side end, in the vehicle width direction, of said stepped-down portion at a lower end thereof, a bead is provided at said stepped-down portion of the upper wall portion of the seat-attaching bracket, the bead being configured to protrude upward and extend from said connection portion toward said side sill in the vehicle width direction, and said side sill comprises front-and-rear gusset members which are respectively provided inside the side sill at positions, in the vehicle longitudinal direction, which substantially correspond to front-and-rear ends of said seat-attaching bracket and joined to the side sill, said seat-attaching bracket comprises a first flange portion which is joined to said front gusset member through the side sill, a second flange portion which is joined to said rear gusset member through the side sill, and a third flange which is joined to the side sill, and a joint point of said side sill and said third flange portion is, in a side view, located between said front gusset member and said rear gusset member and at a higher level than a joint point of said front gusset member and said first flange portion and a joint point of said rear gusset member and said second flange portion.

6. The lower vehicle-body structure of the automotive vehicle of claim 5, wherein said seat-attaching bracket comprises a single flange portion which is integrally formed by connecting said first flange portion, said second flange portion, and said third flange portion.

7. The lower vehicle-body structure of the automotive vehicle of claim 6, wherein said seat-attaching bracket further comprises a front wall portion which is connected to a front end of said upper wall portion at an upper end thereof, joined to said side sill at an outward-side end thereof, and joined to said floor at a lower end thereof, a rear wall portion which is connected to a rear end of said upper wall portion at an upper end thereof, joined to said side sill at an outward-side end thereof, and joined to said floor at a lower end thereof, and a side wall portion which is connected to said upper wall portion at an upper end thereof, connected to an inward-side end of said front wall portion at a front end thereof, and connected to said floor at a lower end thereof, and said single flange portion is integrally formed by connecting a portion which extends forward from an outward-side end, in the vehicle width direction, of said front wall portion, which corresponds to said first flange portion, a portion which extends rearward from an outward-side end, in the vehicle width direction, of said rear wall portion, which corresponds to said second flange portion, and a portion which extends upward from an outward-side end, in the vehicle width direction, of said upper wall portion, which corresponds to said third flange portion.

8. A lower vehicle-body structure of an automotive vehicle comprising:

a pair of right-and-left side sills extending in a vehicle longitudinal direction;

a floor panel connecting the pair of right-and-left side sills in a vehicle width direction; and a seat-attaching bracket connecting the side sill and the floor panel and supporting a seat where a passenger is seated, the seat-attaching bracket being provided with an upper wall portion, wherein said upper wall portion of the seat-attaching bracket comprises a seat-attachment portion which is positioned at an inward side, in the vehicle width direction, thereof and to which the seat is attached, a stepped-down portion which is positioned at a portion thereof which is located on an outward side, in the vehicle width direction, of said seat-attachment portion and extends toward said side sill, and a connection portion which is connected to an outward-side end, in the vehicle width direction, of said seat-attachment portion at an upper end thereof, extends downward from said upper end, and connected to an inward-side end, in the vehicle width direction, of said stepped-down portion at a lower end thereof, a bead is provided at said stepped-down portion of the upper wall portion of the seat-attaching bracket, the bead being configured to protrude upward and extend from said connection portion toward said side sill in the vehicle width direction, said side sill is configured such that an inward-side side face portion thereof comprises a lower portion to which said floor panel and said seat-attaching bracket are joined and an upper portion which extends upward from an upper end of said lower portion and is provided to be offset outward, in the vehicle width direction, from said lower portion, said seat-attaching bracket comprises a front flange portion which extends forward from an outward-side edge portion thereof and is joined to said lower portion of the side sill and a rear flange portion which extends rearward from the outward-side edge portion thereof and is joined to said lower portion of the side sill, and said bead provided at the seat-attaching bracket is configured to slant toward an outward-side edge portion, in the vehicle width direction, of said stepped-down portion in a vehicle front view.

* * * * *